US012431007B2

(12) United States Patent
Trundle

(10) Patent No.: US 12,431,007 B2
(45) **Date of Patent: *Sep. 30, 2025**

(54) POTENTIAL ALARM EVENT MONITORING

(71) Applicant: Alarm.com Incorporated, Tysons, VA (US)

(72) Inventor: Stephen Scott Trundle, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 98 days.

This patent is subject to a terminal disclaimer.

(21) Appl. No.: 18/214,700

(22) Filed: Jun. 27, 2023

(65) Prior Publication Data

US 2023/0334977 A1 Oct. 19, 2023

Related U.S. Application Data

(63) Continuation of application No. 17/327,894, filed on May 24, 2021, now Pat. No. 11,721,199, which is a continuation of application No. 16/858,899, filed on Apr. 27, 2020, now Pat. No. 11,017,659, which is a continuation of application No. 16/449,924, filed on Jun. 24, 2019, now Pat. No. 10,665,089, which is a continuation of application No. 15/984,532, filed on May 21, 2018, now Pat. No. 10,332,386, which is a continuation of application No. 15/583,082, filed on May 1, 2017, now Pat. No. 9,978,255, which is a continuation of application No. 14/981,657, filed on Dec. 28, 2015, now Pat. No. 9,646,486, which is a (Continued)

(51) Int. Cl.

| | |
|---|---|
| ***G08B 29/02*** | (2006.01) |
| ***G08B 13/00*** | (2006.01) |
| ***G08B 25/00*** | (2006.01) |
| ***G08B 29/18*** | (2006.01) |

(52) U.S. Cl.
CPC ............. *G08B 29/02* (2013.01); *G08B 13/00* (2013.01); *G08B 25/001* (2013.01); *G08B 29/188* (2013.01)

(58) Field of Classification Search
USPC ............... 340/501, 506, 517, 565, 566, 541, 340/539.11, 539.1, 531, 527, 529, 522
See application file for complete search history.

(56) References Cited

U.S. PATENT DOCUMENTS 5,027,383 A * 6/1991 Sheffer .................. G08B 29/16 379/39
6,052,054 A 4/2000 Hampson et al.

(Continued)

OTHER PUBLICATIONS

U.S. Non-Final Office Action for U.S. Appl. No. 13/749,099 dated May 5, 2014, 14 pages.

(Continued)

*Primary Examiner* — Daniel Previl
(74) *Attorney, Agent, or Firm* — Fish & Richardson P.C.

(57) ABSTRACT

Alarm system technology, in which an alarm event is detected at a property monitored by an alarm system when the alarm system was set in an armed state. Based on detection of the alarm event, an alarm probability score that indicates a likelihood of the alarm event being an emergency situation is determined and the alarm event is handled based on the determined alarm probability score.

20 Claims, 10 Drawing Sheets

Related U.S. Application Data continuation of application No. 14/691,398, filed on Apr. 20, 2015, now Pat. No. 9,224,285, which is a continuation of application No. 13/749,099, filed on Jan. 24, 2013, now Pat. No. 9,013,294.

(60) Provisional application No. 61/590,029, filed on Jan. 24, 2012.

(56) References Cited

U.S. PATENT DOCUMENTS

| | | | | |
|---|---|---|---|---|
| 6,132,724 | A | 10/2000 | Blum | |
| 6,400,265 | B1 | 6/2002 | Saylor et al. | |
| 7,142,123 | B1 | 11/2006 | Kates | |
| 7,409,045 | B2 * | 8/2008 | Naidoo | G07C 9/20 379/38 |
| 7,435,578 | B2 | 10/2008 | Wikswo et al. | |
| 7,468,663 | B1 | 12/2008 | Rufolo et al. | |
| 7,619,512 | B2 * | 11/2009 | Trundle | G08B 29/00 340/506 |
| 7,920,841 | B2 | 4/2011 | Martin et al. | |
| 7,944,357 | B2 | 5/2011 | Hodges | |
| 8,289,147 | B2 | 10/2012 | Poder | |
| 8,345,097 | B2 | 1/2013 | Zampieron et al. | |
| 8,502,658 | B2 | 8/2013 | Pan et al. | |
| 8,675,066 | B2 | 3/2014 | Trundle et al. | |
| 8,786,425 | B1 | 7/2014 | Hutz | |
| 9,013,294 | B1 * | 4/2015 | Trundle | G08B 13/00 340/522 |
| 9,224,285 | B1 * | 12/2015 | Trundle | G08B 13/00 |
| 9,646,486 | B1 * | 5/2017 | Trundle | G08B 29/02 |
| 9,978,255 | B1 * | 5/2018 | Trundle | G08B 29/02 |
| 10,332,386 | B1 * | 6/2019 | Trundle | G08B 25/001 |
| 10,665,089 | B1 * | 5/2020 | Trundle | G08B 25/001 |
| 11,017,659 | B1 * | 5/2021 | Trundle | G08B 29/02 |
| 11,721,199 | B2 * | 8/2023 | Trundle | G08B 25/001 340/506 |
| 2003/0069002 | A1 * | 4/2003 | Hunter | G08B 21/12 455/567 |
| 2005/0096866 | A1 | 5/2005 | Shan et al. | |
| 2005/0111696 | A1 | 5/2005 | Baer | |
| 2006/0017561 | A1 | 1/2006 | Albert | |
| 2006/0226972 | A1 | 10/2006 | Smith | |
| 2006/0229822 | A1 | 10/2006 | Theobald et al. | |
| 2006/0267780 | A1 | 11/2006 | Adams | |
| 2007/0024707 | A1 | 2/2007 | Brodsky | |
| 2007/0118054 | A1 | 5/2007 | Pinhas et al. | |
| 2007/0131882 | A1 | 6/2007 | Richman | |
| 2007/0262857 | A1 | 11/2007 | Jackson | |
| 2008/0048861 | A1 | 2/2008 | Naidoo et al. | |
| 2008/0079561 | A1 * | 4/2008 | Trundle | G08B 29/02 340/506 |
| 2008/0208828 | A1 | 8/2008 | Boiman et al. | |
| 2008/0284587 | A1 * | 11/2008 | Saigh | H04M 1/72424 340/539.13 |
| 2009/0002189 | A1 | 1/2009 | Liu et al. | |
| 2009/0059602 | A1 | 3/2009 | Santos et al. | |
| 2009/0243852 | A1 | 10/2009 | Haupt et al. | |
| 2009/0260426 | A1 | 10/2009 | Lieberman et al. | |
| 2009/0281838 | A1 | 11/2009 | Lynn et al. | |
| 2010/0026479 | A1 | 2/2010 | Tran | |
| 2010/0188201 | A1 | 7/2010 | Cook et al. | |
| 2010/0289644 | A1 | 11/2010 | Slavin et al. | |
| 2011/0077950 | A1 | 3/2011 | Hughston | |
| 2011/0248847 | A1 | 10/2011 | Huseth et al. | |

OTHER PUBLICATIONS

U.S. Final Office Action for U.S. Appl. No. 13/749,099 dated Sep. 16, 2014, 8 pages.

U.S. Notice of Allowance for U.S. Appl. No. 13/749,099 dated Feb. 2, 2015, 5 pages.

U.S. Non-Final Office Action for U.S. Appl. No. 14/691,398 dated Oct. 8, 2015, 8 pages.

U.S. Non-Final Office Action for U.S. Appl. No. 14/981,657 dated Jun. 21, 2016, 12 pages.

U.S. Notice of Allowance for U.S. Appl. No. 14/691,398 dated Nov. 20, 2015, 5 pages.

U.S. Final Office Action for U.S. Appl. No. 14/981,657 dated Nov. 22, 2016, 12 pages.

* cited by examiner

600

610 620

| | Probability Factor | Weight |
|---|---|---|
| 630 | User Report of Real | 100 |
| 635 | User Report of False | -100 |
| 640 | User Report of Unsure | 0 |
| 645 | Contemporaneous Sensor Data Indicates False | -20 |
| 650 | Contemporaneous Sensor Data Indicates Real | 20 |
| 655 | Alarm Event Aligns with Historical Sensor Data | -10 |
| 660 | Alarm Event Does Not Align with Historical Sensor Data | 10 |
| 665 | Weather Adverse | -5 |
| 670 | Weather Normal | 0 |
| 675 | Alarm Event Aligns with Recent Crime Activity | 10 |
| 680 | Alarm Event Does Not Align with Recent Crime Activity | 0 |
| 685 | Alarm Event Aligns with Other Alarm Events Detected by Nearby Alarm Systems | 10 |
| 690 | Alarm Event Does Not Align with Other Alarm Events Detected by Nearby Alarm Systems | 0 |

FIG. 6

810 820 830

| Priority | Monitoring Server Actions | Central Station Actions |
|---|---|---|
| 840 Low | • Report Low Priority Alert<br>• Request User Feedback on Alert<br>• Continue to Monitor Sensor Data<br>• Send Update to Central Station | • Delay Alarm Verification Processes<br>• Monitor For Update From Server<br>• Initiate Alarm Verification Processes If No Update Received in Threshold Period of Time |
| 850 Medium | • Report Medium Priority Alert<br>• Request User Feedback on Alert<br>• Provide Feedback to Central Station If Received | • Initiate Alarm Verification Processes<br>• Monitor For Feedback From Server<br>• Dispatch Emergency Services If Alarm is Unverified or Confirmed |
| 860 High | • Report High Priority Alert<br>• Send Alert to User Without Requesting Feedback | • Dispatch Emergency Services Immediately Upon Receipt |

FIG. 8

POTENTIAL ALARM EVENT MONITORING

CROSS REFERENCE TO RELATED APPLICATIONS

The present application is a continuation of U.S. application Ser. No. 17/327,894, filed May 24, 2021, which is a continuation of U.S. application Ser. No. 16/858,899, filed Apr. 27, 2020, now U.S. Pat. No. 11,017,659, issued May 25, 2021, which is a continuation of U.S. application Ser. No. 16/449,924, filed Jun. 24, 2019, now U.S. Pat. No. 10,665,089, issued May 26, 2020, which is a continuation of U.S. application Ser. No. 15/984,532, filed May 21, 2018, now U.S. Pat. No. 10,332,386, issued Jun. 25, 2019, which is a continuation of U.S. application Ser. No. 15/583,082, filed May 1, 2017, now U.S. Pat. No. 9,978,255, issued May 22, 2018, which is a continuation of U.S. application Ser. No. 14/981,657, filed Dec. 28, 2015, now U.S. Pat. No. 9,646,486, issued May 9, 2017, which is a continuation of U.S. application Ser. No. 14/691,398, filed Apr. 20, 2015, now U.S. Pat. No. 9,224,285, issued Dec. 29, 2015, which is a continuation of U.S. application Ser. No. 13/749,099, filed Jan. 24, 2013, now U.S. Pat. No. 9,013,294, issued Apr. 21, 2015, which claims the benefit of U.S. Application No. 61/590,029, filed Jan. 24, 2012, all of which are incorporated herein by reference in their entirety for all purposes.

TECHNICAL FIELD

This disclosure relates to handling alarm events based on alarm probability.

BACKGROUND

Many people equip homes and businesses with alarm systems to provide increased security for their homes and businesses. Alarm systems may include control panels that a person may use to control operation of the alarm system and sensors that monitor for security breaches. In response to an alarm system detecting a security breach, the alarm system may generate an audible alert and, if the alarm system is monitored by a monitoring service, the alarm system may send electronic data to the monitoring service to alert the monitoring service of the security breach.

SUMMARY

Techniques are described for handling alarm events based on alarm probability. For example, techniques are described for assessing the likelihood that a detected alarm event is a false alarm and handling the detected alarm event based on the likelihood that the detected alarm event is a false alarm.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

FIGS. 6 and 8 illustrate example data records.

DETAILED DESCRIPTION

Figure 1A:
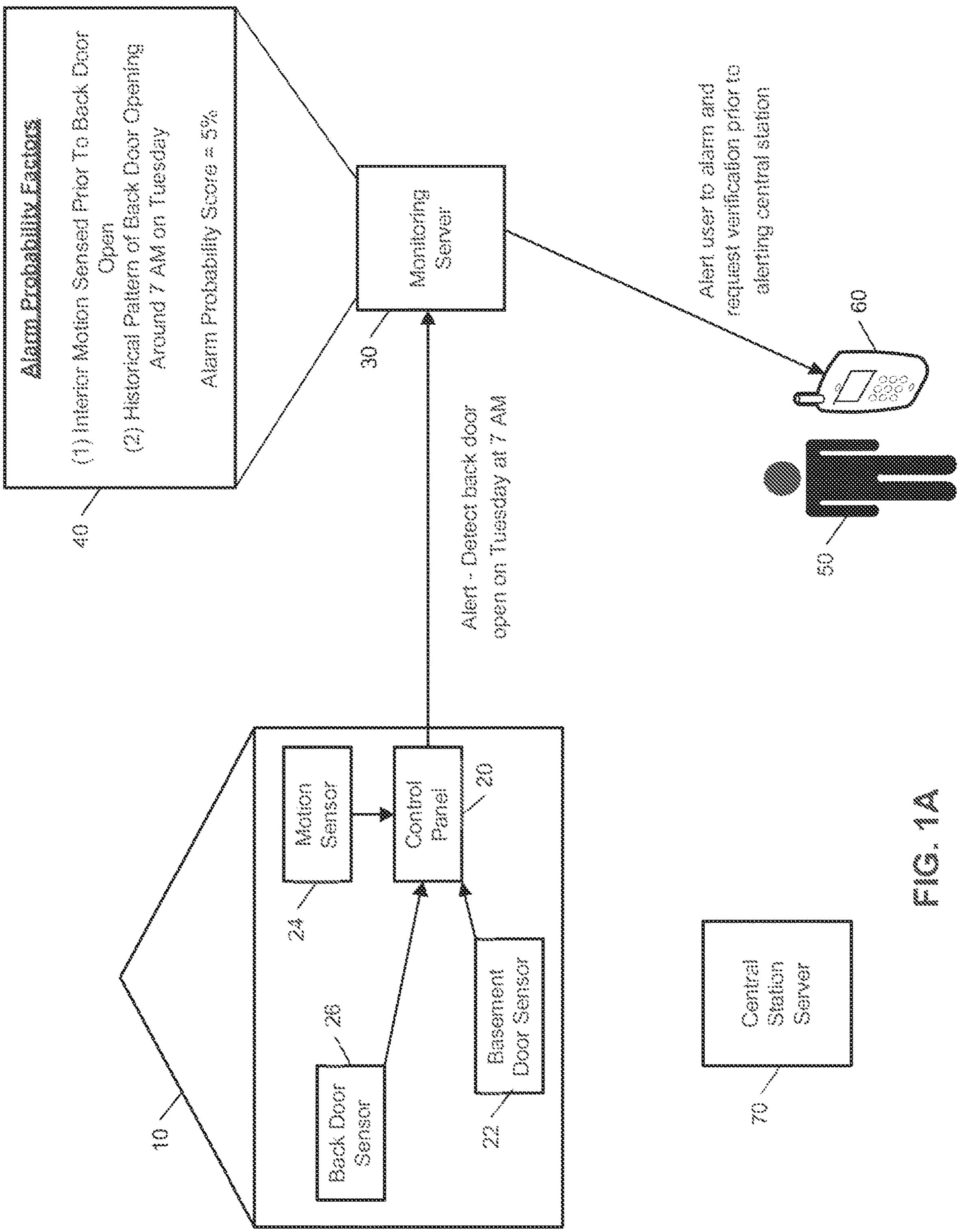
FIGS. 1A-1C illustrate examples of handling alarm events based on alarm probability.

False alarms are a significant issue for security systems. Security systems often detect events that reflect potential alarm conditions, but that are not in fact alarm situations. When a false alarm is detected by a security system and no one is available to confirm that the alarm is false, emergency services may be dispatched unnecessarily. Dispatching emergency services for false alarms consumes resources of emergency personnel and limits the ability of emergency personnel to respond to real alarm situations. In addition, the time spent attempting to verify whether a potential alarm situation detected by a security system is false delays response time for actual alarm situations. To assist in better utilizing resources and increasing response time to actual alarm situations, an alarm probability measure may be provided to a central monitoring station. The alarm probability measure provides a measure of the likelihood that a potential alarm event is a real alarm versus a false alarm.

Techniques are described for providing a central monitoring station with an alarm probability measure in addition to an indication that a potential alarm event has been detected. The alarm probability measure may be determined based on end user feedback related to the potential alarm event and/or heuristics that estimate the likelihood of the potential alarm event being real based on the sensor detecting the potential alarm event, external data sources (e.g., weather data, crime data, etc.), and historical data collected from alarm systems, including the alarm system detecting the potential alarm event. The central monitoring station may use the alarm probability measure to tailor its response to the indication that the potential alarm event has been detected based on the alarm probability measure. For example, the central monitoring station may provide relatively high priority to the potential alarm event when the alarm probability measure indicates a relatively high probability (e.g., seventy-five percent or above) that the potential alarm event is real, may provide relatively medium priority to the potential alarm event when the alarm probability measure indicates a relatively medium probability (e.g., twenty-five to seventy-five percent) that the potential alarm event is real, and may provide relatively low priority to the potential alarm event when the alarm probability measure indicates a relatively low probability (e.g., twenty-five percent or below) that the potential alarm event is real. In this example, the central monitoring station prioritizes its resources to handling those potential alarm events that have a relatively high probability of being real and, therefore, the central monitoring station may provide improved response to real alarm events.

In some implementations, heuristics are used to estimate the likelihood of the potential alarm event being real based on the sensor detecting the potential alarm event, external data sources (e.g., weather data, crime data, etc.), and historical data collected from alarm systems. For example, a security system may detect that a door identified as "basement door" has been opened at 5:15 am while the system is armed, thereby triggering an alarm. In this example, the system proceeds to estimate the probability of the alarm being real by analyzing current and historical data for the property. For instance, the system may scan all historical data and find that in the last four years, the basement door has never been the first door opened when the system is armed. In fact, the historical data might show that when the system is armed, the kitchen door was used to breach the property 67% of the time, the front door was used 29% of the time, and the side door was used 4% of the time. Because the basement door has never been used to breach the property while the system was armed in the last four years, the probability of the alarm being real might be deemed by the system to be higher.

Further, in the same scenario, the system may attempt to assess whether or not someone already inside the property opened the basement door. For instance, the system might look for the last evidence of motion in the property. If the system has found no motion in the property in the last four days, then the system might determine that it is unlikely that someone authorized was simply sleeping in the basement when the system armed and, as such, conclude that this alarm is more likely to be real.

As an additional step in the above example, the system might survey current weather data for the property location. If the system finds that there is currently a high wind advisory, or an electrical storm passing by the property, then the system might reduce the probability of the alarm being real because severe weather can occasionally cause an inadvertent trip of a security sensor. Alternatively, if no such conditions exist, the probability of the alarm being real may be further increased.

The system may further survey other alarm data, and property crime data for the geographic area in which the property is located. If there has recently been an increase in property crime in the area, or if there has been a pattern of early morning break-ins in the area, the system may deduce that the probability of this being a real alarm is higher and increase the probability of the alarm being real. The system may further look at the history of false alarms at the particular property. If the property has generated a false alarm on average every sixteen days, then it may reduce the probability of the alarm being real. If, however, the system has rarely generated a false alarm, the probability might be increased.

The system may further observe events immediately prior to the alarm event in assessing alarm probability. If, for example, the system observed that the phone line was cut (measured via voltage drop on the POTS connection), or the broadband connection to the property was disabled, or the system noticed that the power to property was cut (indicative of an intruder shutting off the power main), or the system noticed a higher than normal prevalence of spurious cellular frequency transmissions (evidence of potential cellular jamming technology being used), then the system may conclude there is a higher probability of the alarm being real. The system may use these and other statistical methods to determine the likelihood of the alarm event being real such that a central monitoring station and the first responders can prioritize their response to detected alarms.

In some examples, end user feedback may be used (alone or in combination with other heuristics described throughout this disclosure) in determining alarm probability measures. In these examples, a security system that monitors a property detects a potential alarm event and, based on detection of the potential alarm event, sends a message to a central monitoring station indicating the potential alarm event. Based on detection of the potential alarm event, the security system also sends a communication with an image of the alarm event (e.g., an image of an area of the property near a sensor that detected the potential alarm event) to an end user's device (e.g., mobile device). The communication includes options to allow the message recipient to verify whether the potential alarm event is real (e.g., REAL, FALSE, NOT SURE). Based on review of the communication and image, the end user inputs a response (e.g., presses a user interface button corresponding to one of REAL, FALSE, NOT SURE) and the end user's response is forwarded to the central monitoring station to assist in handling the potential alarm event. For instance, the central monitoring station may immediately dispatch emergency services when the end user's response indicates that the potential alarm event is real, may halt dispatching of emergency services when the end user's response indicates that the potential alarm event is false, and may delay dispatching emergency services for further investigation when the end user's response indicates that the end user is not sure whether the potential alarm event is real or false.

Figure 1B:
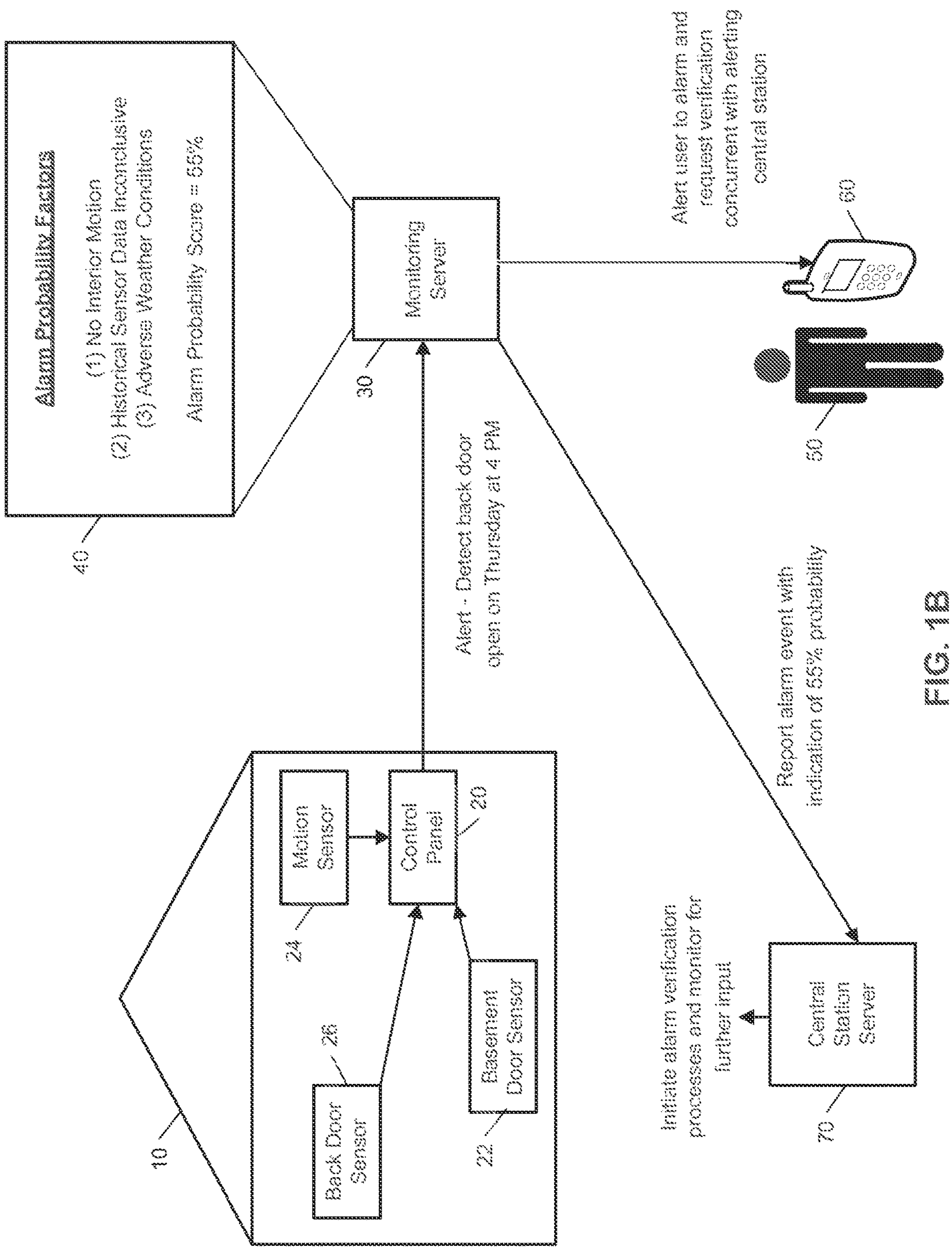
Figure 1C:
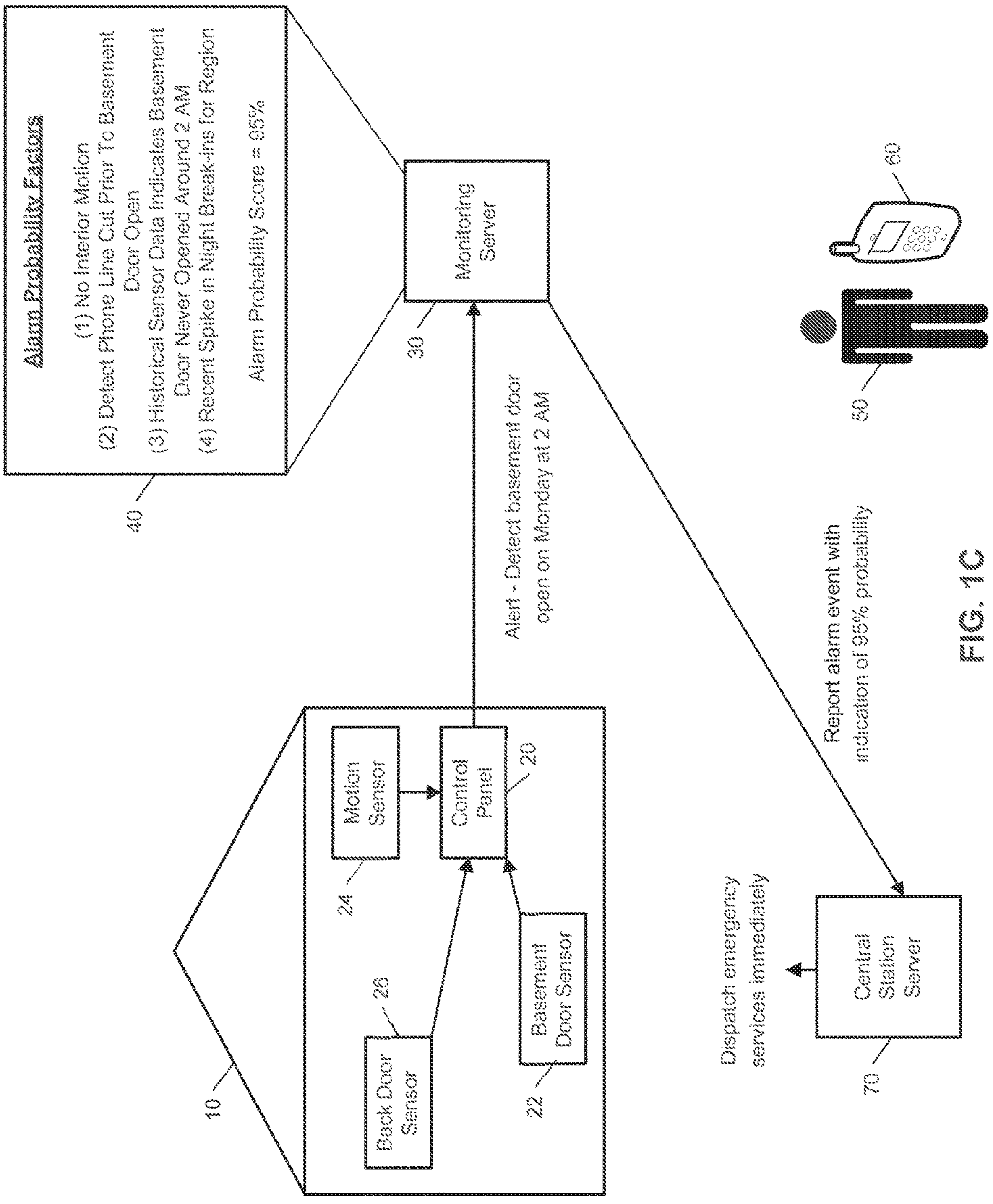

FIGS. 1A-1C illustrate examples of using heuristics, and feedback to determine and handle alarm events based on alarm probability scores. As shown in FIG. 1A, a property 10 (e.g., a home) of a user 50 is monitored by an alarm system (e.g., an in-home security system) that includes components that are fixed within the property 10. The alarm system includes a control panel 20, a basement door sensor 22, a motion sensor 24, and a back door sensor 26. The basement door sensor 22 is a contact sensor positioned at a basement door of the property 10 and configured to sense whether the basement door is in an open position or a closed position. The motion sensor 24 is configured to sense a moving object within the property 10. The back door sensor 26 is a contact sensor positioned at a back door of the property 10 and configured to sense whether the back door is in an open position or a closed position.

The control panel 20 communicates over a short-range wired or wireless connection with each of the basement door sensor 22, motion sensor 24, and the back door sensor 26 to receive sensor data descriptive of events detected by the basement door sensor 22, the motion sensor 24, and the back door sensor 26. The control panel 20 also communicates over a long-range wired or wireless connection with a monitoring server 30. The monitoring server 30 is located remote from the property 10 and manages the alarm system at the property 10, as well as other (and, perhaps, many more) alarm systems located at different properties that are owned by different users. The monitoring server 30 receives, from the control panel 20, sensor data descriptive of events detected by the sensors included in the alarm system of the property 10.

In the example shown in FIG. 1A, the monitoring server 30 receives an alert from the control panel 20 indicating that the alarm system has detected the back door opening on Tuesday at 7:00 AM while the alarm system is set in an armed state. For example, the control panel 20 may receive an indication from the back door sensor 26 that the back door has been opened, and based on receiving the indication may provide an alert to the monitoring server 30. In response to receiving the alert, the monitoring server 30 estimates the likelihood that the alert relating to the alarm event is an emergency situation.

To estimate the likelihood that the alert relating to the alarm event is an emergency situation, the monitoring server 30 accesses data relevant to the alert and uses the accessed data to determine an alarm probability score associated with the alert. The monitoring server 30 performs heuristics on the accessed data to determine an alarm probability score associated with the alert that indicates an estimate of the likelihood that the alarm event is an emergency situation. The accessed data includes various data that is collected by the alarm system monitoring the property 10, identified as internal data, as well as various data that is collected from outside of the alarm system monitoring the property 10, identified as external data.

The monitoring server 30 accesses contemporaneous sensor data collected by the alarm system associated with the property 10. In the example shown in FIG. 1A, contemporaneous sensor data includes data from the motion sensor 24 and the basement door sensor 22 associated with the alarm system, where the contemporaneous data may be sensor data captured within a threshold period of time before or after the alarm event. The monitoring server 30 may include some or all of the contemporaneous sensor data collected by the alarm system in the alarm probability factors 40 used to determine the alarm probability score. In the example shown in FIG. 1A, the interior motion sensor 24 senses motion prior to the back door sensor detecting the back door opening, and this data is included in the alarm probability factors 40 used to determine the alarm probability score.

The monitoring server 30 also accesses historical usage data that is defined based on historical sensor data collected by the alarm system. In the example shown in FIG. 1A, historical sensor data includes historical data from the basement door sensor 22, the motion sensor 24, and the back door sensor 26, where the historical data may be data captured by the alarm system associated with the property 10 during past time periods that are similar to a time frame of the detected alarm event. The monitoring server 30 may include relevant historical sensor data collected by the alarm system in the alarm probability factors 40 used to determine the alarm probability score. For example, in FIG. 1A historical sensor data from the back door sensor 26 indicates that there is a historical pattern reciting that the back door opens around 7:00 AM on Tuesdays, and the monitoring server 30 includes this historical data in the alarm probability factors 40 used to determine the likelihood of the detected alarm event being an emergency situation.

In addition to accessing data collected by the alarm system associated with the property 10 to estimate the likelihood that a detected alarm event is an emergency situation, the monitoring server 30 accesses external data that is relevant to the alarm event and captured by a system other than the alarm system associated with the property 10. The monitoring system may include relevant data captured by the other systems in the alarm probability factors 40. The alarm probability factors 40 may then be used to determine an alarm probability score to estimate the likelihood that the detected alarm event is an emergency situation.

The monitoring system 30 can access weather data that describes weather conditions at the property 10 that is monitored by the alarm system, where the accessed weather data is relevant to a time associated with the alarm event. The monitoring system 30 can evaluate the accessed weather data to determine whether the accessed weather data suggests that the detected alarm event could have been caused by the weather conditions at the property 10. The monitoring system 30 may include the weather data in the alarm probability factors 40, where the monitoring system 30 may estimate the likelihood that the detected alarm event is an emergency situation based on the evaluation of whether the weather data suggests that the alarm event could have been caused by the weather at the property 10.

The monitoring system 30 can access crime data that describes crime activity in a region of the property 10 monitored by the alarm system. Based on accessing the crime data, the monitoring system 30 evaluates whether the crime data suggests that the detected alarm event matches crime activity reported in the region of the property 10 monitored by the alarm system, and estimates the likelihood of the detected alarm event being an emergency situation based on the evaluation of whether the accessed crime data suggests that the alarm event matches crime activity reported in the region of the property 10. The monitoring system 30 may perform such an estimate by including the crime data in the alarm probability factors 40, and by computing an alarm probability score based on the alarm probability factors 40 that indicates an estimated likelihood of the alarm event being an emergency situation.

The monitoring system 30 may also access locale data, defined based on sensor data that is collected by other alarm systems other than the alarm system associated with the property 10, and may evaluate the locale data to determine whether the data suggests that the alarm event is similar to other alarm events detected by the other alarm systems located in the same region as the property 10. Based on the evaluation, the monitoring system 30 may estimate the likelihood that the alarm event is an emergency situation, for example, by including the locale data in the alarm probability factors 40 and determining an alarm probability score based on at least the locale data.

Based on the accessed data and the evaluation of the accessed data to determine an alarm probability score indicating the estimated likelihood that the alarm event is an emergency situation, the monitoring server 30 handles the alarm event. Handling the event can include comparing the alarm probability score to one or more thresholds to determine a response to the detected alarm event. For example, as shown in FIG. 1A, the monitoring server 30 evaluates the alarm probability factors 40 and determines an alarm probability score of 5% associated with the detected alarm event of the back door of the property 10 opening at 7:00 AM on Tuesday. The monitoring server 30 may then compare the alarm probability score of 5% to one or more thresholds to determine how the system should handle the detected alarm event.

In some implementations, the monitoring server 30 determines a response to the detected alarm event by comparing the determined alarm probability score to a threshold, where the monitoring server 30 can determine whether the alarm probability score satisfies the threshold. The monitoring server 30 may determine that the alarm probability score meets the particular threshold, and based on determining that the alarm probability score meets the threshold, may report the alarm event to a central monitoring service that dispatches emergency services in response to alarm events. For example, the monitoring server 30 may determine that the alarm probability score satisfies the threshold and may communicate with a central station server 70 to report that an alarm event detected by the alarm system at the property 10 has been identified as an emergency situation, where the central station server 70 may then dispatch emergency services in response to the report from the monitoring server 30.

In some instances, the monitoring server 30 may compare the alarm probability score to the threshold and determine that the alarm probability threshold does not meet the threshold. In such instances, the monitoring server 30 may delay reporting the alarm event to a central monitoring service, such as the central monitoring service that operates the central station server 70. The monitoring server 30 may delay reporting the detected alarm event to the central monitoring service to enable the collection of more information related to whether the alarm event relates to an emergency situation.

Delaying the reporting of the detected alarm event to collect more information related to the alert can include reporting the alarm event to a user device associated with the property 10 monitored by the alarm system, and including with the report a request to verify whether the alarm event relates to an emergency situation. The monitoring system 30 outputs the report to the user device 60 associated with a user 50, for example, a user device associated with an owner of the property 10.

Additionally, providing the user device 60 with the report of the detected alarm event and the request to verify the detected alarm event can include accessing image data of an area of the property 10 associated with the alarm event and providing the accessed image data to the user device 60 along with the report. For example, based on detecting a back door opening event, the alarm system monitoring the property 10 may access image data from a camera that can view the back door, and the monitoring server 30 may include the image data from the camera to the user device 60 when reporting the detected alarm event. The provided image data may enable a user 50 associated with the user device 60 to determine whether the detected alarm event is valid, where the user 50 may then provide a response to the report indicating whether the detected alarm event should be handled as an emergency event.

In some instances, the monitoring server 30 may compare the alarm probability score to more than one threshold score and may determine that the alarm probability score meets some, but not all, of the thresholds. For example, the monitoring server 30 may compare the alarm probability score to a first, lower threshold and may determine that the alarm probability score satisfies the first threshold, and may also compare the alarm probability score to a second, higher threshold and may determine that the alarm probability score does not satisfy the second threshold. Based on the determining that the alarm probability score satisfies the first threshold but not the second threshold, the system may handle the detected alarm event. For example, the monitoring server 30 may report the alarm to a user device 60 associated with a user 50 with a request to verify whether the alarm event relates to an emergency situation, and may simultaneously report the detected alarm event along with the alarm probability score to a central monitoring service.

Determining whether the determined alarm probability score meets one or more thresholds can enable the monitoring server 30 to assign a priority to the detected alarm event, where the system can then determine how to handle the alarm event based on the assigned priority. In some implementations, the assigned priority may be one of a low priority, a medium priority, or a high priority. For example, the monitoring server 30 may compare an alarm probability score associated with a detected alarm event to both a first, lower threshold, may determine that the alarm probability score does not satisfy the threshold, and based on the alarm probability score not satisfying the first threshold may assign the detected alarm event a low priority. In another example, the monitoring server may compare an alarm probability score to a first, lower threshold, may determine that the alarm probability score satisfies the threshold, and may also compare the alarm probability score to a second, higher threshold, where the monitoring server 30 may determine that the alarm probability score does not satisfy the second threshold. Based on the alarm probability score satisfying the first threshold but not the second threshold, the monitoring server 30 may assign the detected alarm event a medium priority. In yet another example, the system may compare an alarm probability score to a first, lower threshold as well as a second, higher threshold, may determine that the alarm probability score satisfies both the first and second thresholds, and as a result may assign the detected alarm event a high priority.

Returning to the example shown in FIG. 1A, the monitoring server 30 has included two factors in the alarm probability factors 40 that are based on accessed data. The two factors include (1) that the motion sensor 24 sensed interior motion prior to the back door opening, and (2) a historical pattern of the back door opening around 7:00 AM on Tuesdays. Based on the alarm probability factors 40, the monitoring server 30 evaluates the detected alarm event of the back door opening on Tuesday at 7:00 AM and determines an alarm probability score of 5% for the detected event. The monitoring server may then compare the alarm probability score of 5% to a threshold, such as a threshold of 25%, and may determine that the alarm probability score of 5% does not meet this threshold. In some instances, determining that the alarm probability score of 5% does not meet the threshold of 25% may cause the monitoring server 30 to assign a low priority rating to the detected alarm event. Based on determining that the alarm probability score of 5% does not meet the threshold, the system delays reporting the alarm event to a central monitoring service, for example, by delaying reporting the detected alarm event to a central station server 70 operated by the central monitoring service. The monitoring server 30 delays reporting of the detected alarm event to the central station server 70 so that the monitoring server can collect more information related to whether the alarm event relates to an emergency situation. To collect more information, the monitoring server 30 sends an alert to a user device 60 associated with the user 50, where the alert indicates the detected alarm event and includes a request to verify the detected alarm event as an emergency situation prior to alerting the central station.

Based on the response to the request to verify the detected alarm event as an emergency situation, the system can respond to the detected alarm event. For example, if the user 50 indicates at the user device 60 that the detected alarm event is an emergency situation, the monitoring server 30 may respond by reporting the detected alarm event to the central station server 70, where the central monitoring service associated with the central station server 70 may then dispatch emergency services. Alternatively, if the user 50 indicates at the user device 60 that the detected alarm event is not an emergency situation, the monitoring server may not report the alarm event to the central station server 70, and may ignore the alert relating to the detected alarm event, may rearm the alarm system, or may take other actions in response to the detected event not being an emergency situation.

In some instances, based on receiving feedback from the user 50 indicating whether the detected alarm event is or is not an emergency situation, the system may update one or more rules used in determining the alarm probability score. For example, the monitoring server 30 may receive feedback from the user device 60 indicating that the detected alarm event is an emergency situation, and may update one or more rules associated with determining the alarm probability score that will result in future detected alarm events of this type receiving a higher alarm probability score. Additionally or alternatively, if the monitoring server 30 receives feedback indicating that the detected alarm event is not an emergency situation, the system may update one or more rules associated with the determining the alarm probability score that will result in future detected alarm events of this type receiving a lower alarm probability score.

In the example shown in FIG. 1B, the control panel 20 detects a back door open event at 4:00 PM on Thursday based on receiving an indication from the back door sensor 26. The control panel 20 provides an alert to the monitoring server 30 indicating the detected alarm event, and the monitoring server 30 proceeds to access data relevant to the detected alarm event. The monitoring server 30 accesses data including data indicating (1) that there was no interior motion detected by the motion sensor 24, (2) that the historical sensor data relating to the detected alarm event is inconclusive, and (3) that there are adverse weather conditions at the property 10. The monitoring server 30 includes these factors in the alarm probability factors 40, where the monitoring system 30 then evaluates the factors to determine an alarm probability score relating to the back door opening on Thursday at 4:00 PM of 55%. The monitoring server 30 may then determine how to handle the detected alarm event, based on the determined alarm probability score.

To determine the handling of the detected alarm event, the monitoring server 30 may compare the alarm probability score of 55% to one or more thresholds. For example, the monitoring server 30 may compare the alarm probability score of 55% to a first, lower threshold of 25%, may determine that the alarm probability score meets this first threshold, and may compare the alarm probability score to a second, higher threshold of 75%, where the monitoring server 30 determines that the alarm probability score does not meet the second threshold. In some instances, based on determining that the alarm probability score meets the first threshold but does not meet the second threshold, the system may assign a priority to the detected alarm event, such as a medium priority rating.

After determining that the alarm probability score satisfies the first, lower threshold but does not satisfy the second, higher threshold, the monitoring server handles the detected alarm event by providing an alert to a user device 60 reporting the detected alarm event and requesting verification of whether the alarm event relates to an emergency situation. Concurrently, the monitoring server 30 reports the detected alarm event to the central station server 70 associated with the central monitoring service, where the report includes an indication of the alarm probability score of 55%. Based on receiving the report from the monitoring server 30, the central station server 70 initiates one or more alarm verification processes and monitors for further input relating to the reported alarm event. For example, the central station server 70 may await an indication from the monitoring server 30 relating to a response from the client device 60 that indicates whether the detected alarm event is an emergency situation. Based on the further input received at the central station server 70, the central monitoring service may respond to the detected alarm event, for example, by dispatching emergency services to the property 10 in response to the alarm event, or by not dispatching emergency services in response to the alarm event.

In the example shown in FIG. 1C, the control panel 20 detects a basement door opening event at 2:00 AM on a Monday based on receiving an indication from the basement door sensor 22. The control panel 20 provides an alert to the monitoring server 30 indicating the detected alarm event, and the monitoring server 30 proceeds to access data relevant to the detected alarm event. The monitoring server accesses data that includes data indicating (1) that there was no interior motion detected by the motion sensor 24, (2) that the alarm system monitoring the property 10 detected the phone line being cut prior to the basement door sensor 22 detecting the basement door being opened, (3) that historical sensor data collected from the alarm system indicates that the basement door is never opened around 2:00 AM, and (4) that there has been a recent spike in night time break-ins for the region of the property 10. The monitoring system 30 includes these factors in the alarm probability factors 40, where the monitoring system 30 then evaluates the factors to determine an alarm probability score estimating the likelihood that basement door opening at 2:00 AM on Monday should be treated as an emergency situation. Based on the evaluation, the monitoring server 30 determines an alarm probability score of 95% associated with the detected alarm event, and subsequently determines how to handle the detected alarm event based on the determined alarm probability score.

To determine the handling of the detected alarm event, the monitoring server 30 may compare the alarm probability score of 95% to one or more thresholds. For example, the monitoring server 30 may compare the alarm probability score to a first threshold of 25%, may determine that the alarm probability score meets the first threshold, and may further compare the alarm probability score to a second threshold of 75% and determine that the alarm probability score also satisfies the second threshold. Based on determining that the alarm probability score satisfies both the first and second thresholds, the system may, in some instances, assign a priority to the detected alarm event, such as a high priority rating.

After determining that the alarm probability score satisfies both the first, lower threshold and the second, higher threshold, the monitoring server 30 may handle the alarm event by reporting the alarm even to the central station server 70 associated with the central monitoring service. The report may indicate both the detected alarm event as well as the alarm probability score of 95% associated with the alarm event. Based on receiving the report from the monitoring server 30, the central station server 70 may dispatch emergency services immediately. For example, the central station server 70 may be configured by the central monitoring service to immediately dispatch emergency services upon receiving a report of a detected alarm event with an alarm probability score above a certain level, or having a certain priority.

Figure 2:
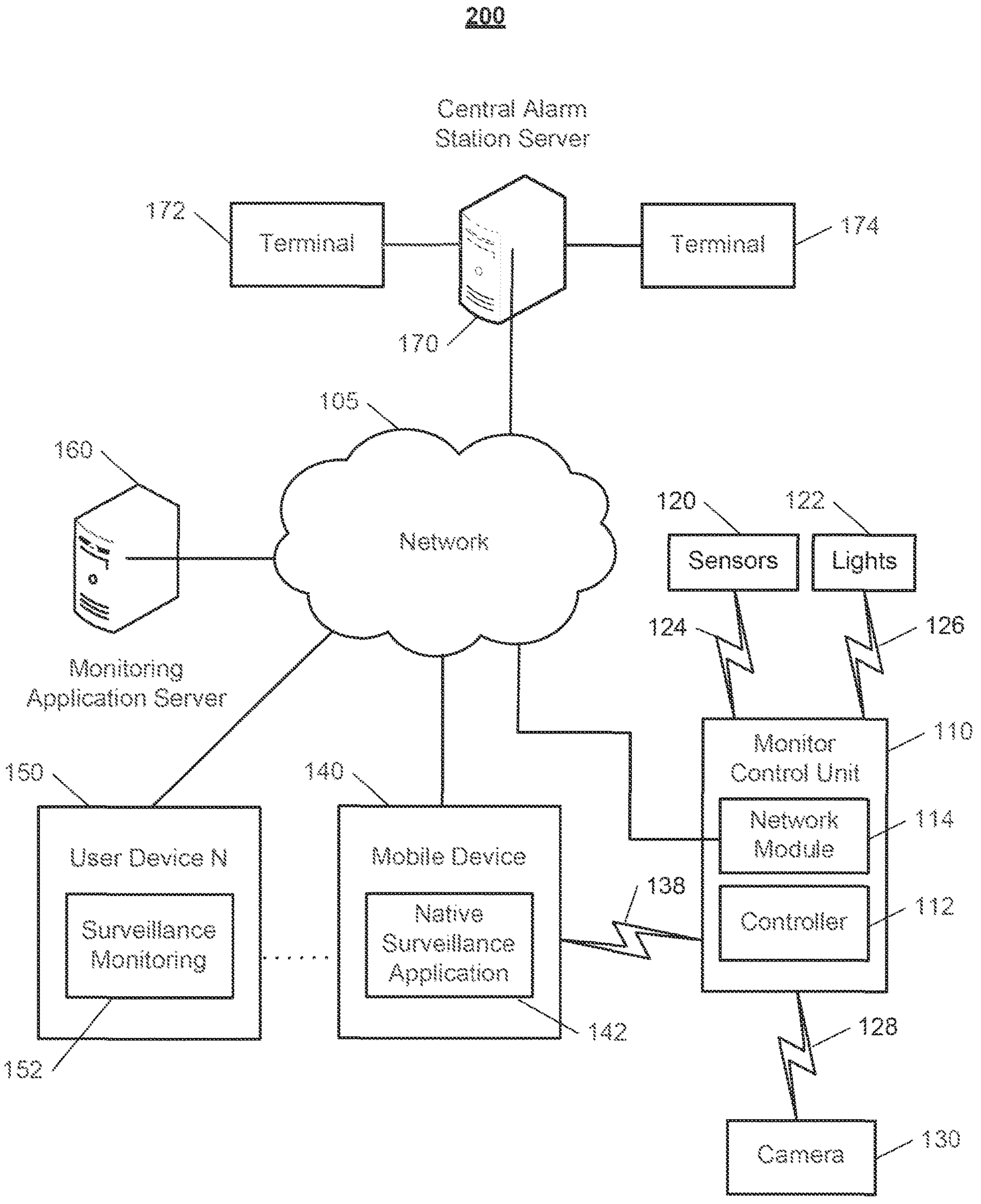
FIG. 2 illustrates an example system.

FIG. 2 illustrates an example of an electronic system 200 configured to provide surveillance and reporting. The electronic system 200 includes a network 105, a monitoring system control unit 110, one or more user devices 140, 150, a monitoring application server 160, and a central alarm station server 170. In some examples, the network 105 facilitates communications between the monitoring system control unit 110, the one or more user devices 140, 150, the monitoring application server 160, and the central alarm station server 170.

The network 105 is configured to enable exchange of electronic communications between devices connected to the network 105. For example, the network 105 may be configured to enable exchange of electronic communications between the monitoring system control unit 110, the one or more user devices 140, 150, the monitoring application server 160, and the central alarm station server 170. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitoring system control unit 110 includes a controller 112 and a network module 114. The controller 112 is configured to control a monitoring system (e.g., a home alarm or security system) that includes the monitoring system control unit 110. In some examples, the controller 112 may include a processor or other control circuitry configured to execute instructions of a program that controls operation of an alarm system. In these examples, the controller 112 may be configured to receive input from sensors, detectors, or other devices included in the alarm system and control operations of devices included in the alarm system or other household devices (e.g., a thermostat, an appliance, lights, etc.). For example, the controller 112 may be configured to control operation of the network module 114 included in the monitoring system control unit 110.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitoring system control unit 110 to communicate over a local area network and/or the Internet. The network module 114 also may be a voiceband modem configured to enable the alarm panel to communicate over the telephone lines of Plain Old Telephone Systems (POTS).

The monitoring system that includes the monitoring system control unit 110 includes one or more sensors or detectors. For example, the monitoring system may include multiple sensors 120. The sensors 120 may include a contact sensor, a motion sensor, a glass break sensor, or any other type of sensor included in an alarm system or security system. The sensors 120 also may include an environmental sensor, such as a temperature sensor, a water sensor, a rain sensor, a wind sensor, a light sensor, a smoke detector, a carbon monoxide detector, an air quality sensor, etc. The sensors 120 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 120 may include a radio-frequency identification (RFID) sensor that identifies a particular article that includes a pre-assigned RFID tag.

The monitoring system control unit 110 communicates with the module 122 and the camera 130 to perform surveillance or monitoring. The module 122 is connected to one or more lighting systems and is configured to control operation of the one or more lighting systems. The module 122 may control the one or more lighting systems based on commands received from the monitoring system control unit 110. For instance, the module 122 may cause a lighting system to illuminate an area to provide a better image of the area when captured by a camera 130.

The camera 130 may be a video/photographic camera or other type of optical sensing device configured to capture images. For instance, the camera 130 may be configured to capture images of an area within a building monitored by the monitoring system control unit 110. The camera 130 may be configured to capture single, static images of the area and also video images of the area in which multiple images of the area are captured at a relatively high frequency (e.g., thirty images per second). The camera 130 may be controlled based on commands received from the monitoring system control unit 110.

The camera 130 may be triggered by several different types of techniques. For instance, a Passive Infra Red (PIR) motion sensor may be built into the camera 130 and used to trigger the camera 130 to capture one or more images when motion is detected. The camera 130 also may include a microwave motion sensor built into the camera and used to trigger the camera 130 to capture one or more images when motion is detected. The camera 130 may have a "normally open" or "normally closed" digital input that can trigger capture of one or more images when external sensors (e.g., the sensors 120, PIR, door/window, etc.) detect motion or other events. In some implementations, the camera 130 receives a command to capture an image when external devices detect motion or another potential alarm event. The camera 130 may receive the command from the controller 112 or directly from one of the sensors 120.

In some examples, the camera 130 triggers integrated or external illuminators (e.g., Infra Red, Z-wave controlled "white" lights, lights controlled by the module 122, etc.) to improve image quality when the scene is dark. An integrated or separate light sensor may be used to determine if illumination is desired and may result in increased image quality.

The camera 130 may be programmed with any combination of time/day schedules, system "arming state", or other variables to determine whether images should be captured or not when triggers occur. The camera 130 may enter a low-power mode when not capturing images. In this case, the camera 130 may wake periodically to check for inbound messages from the controller 112. The camera 130 may be powered by internal, replaceable batteries if located remotely from the monitoring control unit 110. The camera 130 may employ a small solar cell to recharge the battery when light is available. Alternatively, the camera 130 may be powered by the controller's 112 power supply if the camera 130 is co-located with the controller 112.

The sensors 120, the module 122, and the camera 130 communicate with the controller 112 over communication links 124, 126, and 128. The communication links 124, 126, and 128 may be a wired or wireless data pathway configured to transmit signals from the sensors 120, the module 122, and the camera 130 to the controller 112. The sensors 120, the module 122, and the camera 130 may continuously transmit sensed values to the controller 112, periodically transmit sensed values to the controller 112, or transmit sensed values to the controller 112 in response to a change in a sensed value.

The communication link 128 over which the camera 130 and the controller 112 communicate may include a local network. The camera 130 and the controller 112 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CATS) or Category 6 (CAT6) wired Ethernet network.

The monitoring application server 160 is an electronic device configured to provide monitoring services by exchanging electronic communications with the monitoring system control unit 110, the one or more user devices 140, 150, and the central alarm station server 170 over the network 105. For example, the monitoring application server 160 may be configured to monitor events (e.g., alarm events) generated by the monitoring system control unit 110. In this example, the monitoring application server 160 may exchange electronic communications with the network module 114 included in the monitoring system control unit 110 to receive information regarding events (e.g., alarm events) detected by the monitoring system control unit 110. The monitoring application server 160 also may receive information regarding events (e.g., alarm events) from the one or more user devices 140, 150.

In some examples, the monitoring application server 160 may route alarm data received from the network module 114 or the one or more user devices 140, 150 to the central alarm station server 170. For example, the monitoring application server 160 may transmit the alarm data to the central alarm station server 170 over the network 105.

The monitoring application server 160 may store sensor and image data received from the monitoring system and perform analysis of sensor and image data received from the monitoring system. Based on the analysis, the monitoring application server 160 may communicate with and control aspects of the monitoring system control unit 110 or the one or more user devices 140, 150.

The central alarm station server 170 is an electronic device configured to provide alarm monitoring service by exchanging communications with the monitoring system control unit 110, the one or more mobile devices 140, 150, and the monitoring application server 160 over the network 105. For example, the central alarm station server 170 may be configured to monitor alarm events generated by the monitoring system control unit 110. In this example, the central alarm station server 170 may exchange communications with the network module 114 included in the monitoring system control unit 110 to receive information regarding alarm events detected by the monitoring system control unit 110. The central alarm station server 170 also may receive information regarding alarm events from the one or more mobile devices 140, 150.

The central alarm station server 170 is connected to multiple terminals 172 and 174. The terminals 172 and 174 may be used by operators to process alarm events. For example, the central alarm station server 170 may route alarm data to the terminals 172 and 174 to enable an operator to process the alarm data. The terminals 172 and 174 may include general-purpose computers (e.g., desktop personal computers, workstations, or laptop computers) that are configured to receive alarm data from a server in the central alarm station server 170 and render a display of information based on the alarm data. For instance, the controller 112 may control the network module 114 to transmit, to the central alarm station server 170, alarm data indicating that a sensor 120 detected a door opening when the monitoring system was armed. The central alarm station server 170 may receive the alarm data and route the alarm data to the terminal 172 for processing by an operator associated with the terminal 172. The terminal 172 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 172 and 174 may be mobile devices or devices designed for a specific function. Although FIG. 1 illustrates two terminals for brevity, actual implementations may include more (and, perhaps, many more) terminals.

The one or more user devices 140, 150 are devices that host and display user interfaces. For instance, the user device 140 is a mobile device that hosts one or more native applications (e.g., the native surveillance application 142). The user device 140 may be a cellular phone or a non-cellular locally networked device with a display. The user device 140 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 140 may perform functions unrelated to the monitoring system, such as placing personal telephone calls, playing music, playing video, displaying pictures, browsing the Internet, maintaining an electronic calendar, etc.

The user device 140 includes a native surveillance application 142. The native surveillance application 142 refers to a software/firmware program running on the corresponding mobile device that enables the user interface and features described throughout. The user device 140 may load or install the native surveillance application 142 based on data received over a network or data received from local media. The native surveillance application 142 runs on mobile devices platforms, such as iPhone, iPod touch, Blackberry, Google Android, Windows Mobile, etc. The native surveillance application 142 enables the user device 140 to receive and process image and sensor data from the monitoring system.

The user device 150 may be a general-purpose computer (e.g., a desktop personal computer, a workstation, or a laptop computer) that is configured to communicate with the monitoring application server 160 and/or the monitoring system control unit 110 over the network 105. The user device 150 may be configured to display a surveillance monitoring user interface 152 that is generated by the user device 150 or generated by the monitoring application server 160. For example, the user device 150 may be configured to display a user interface (e.g., a web page) provided by the monitoring application server 160 that enables a user to perceive images captured by the camera 130 and/or reports related to the monitoring system. Although FIG. 1 illustrates two user devices for brevity, actual implementations may include more (and, perhaps, many more) or fewer user devices.

In some implementations, the one or more user devices 140, 150 communicate with and receive monitoring system data from the monitoring system control unit 110 using the communication link 138. For instance, the one or more user devices 140, 150 may communicate with the monitoring system control unit 110 using various local wireless protocols such as wifi, Bluetooth, zwave, zigbee, HomePlug (ethernet over powerline), or wired protocols such as Ethernet and USB, to connect the one or more user devices 140, 150 to local security and automation equipment. The one or more user devices 140, 150 may connect locally to the monitoring system and its sensors and other devices. The local connection may improve the speed of status and control communications because communicating through the network 105 with a remote server (e.g., the monitoring application server 160) may be significantly slower.

Although the one or more user devices 140, 150 are shown as communicating with the monitoring system control unit 110, the one or more user devices 140, 150 may communicate directly with the sensors and other devices controlled by the monitoring system control unit 110. In some implementations, the one or more user devices 140, 150 replace the monitoring system control unit 110 and perform the functions of the monitoring system control unit 110 for local monitoring and long range/offsite communication.

In other implementations, the one or more user devices 140, 150 receive monitoring system data captured by the monitoring system control unit 110 through the network 105. The one or more user devices 140, 150 may receive the data from the monitoring system control unit 110 through the network 105 or the monitoring application server 160 may relay data received from the monitoring system control unit 110 to the one or more user devices 140, 150 through the network 105. In this regard, the monitoring application server 160 may facilitate communication between the one or more user devices 140, 150 and the monitoring system.

In some implementations, the one or more user devices 140, 150 may be configured to switch whether the one or more user devices 140, 150 communicate with the monitoring system control unit 110 directly (e.g., through link 138) or through the monitoring application server 160 (e.g., through network 105) based on a location of the one or more user devices 140, 150. For instance, when the one or more user devices 140, 150 are located close to the monitoring system control unit 110 and in range to communicate directly with the monitoring system control unit 110, the one or more user devices 140, 150 use direct communication. When the one or more user devices 140, 150 are located far from the monitoring system control unit 110 and not in range to communicate directly with the monitoring system control unit 110, the one or more user devices 140, 150 use communication through the monitoring application server 160.

Although the one or more user devices 140, 150 are shown as being connected to the network 105, in some implementations, the one or more user devices 140, 150 are not connected to the network 105. In these implementations, the one or more user devices 140, 150 communicate directly with one or more of the monitoring system components and no network (e.g., Internet) connection or reliance on remote servers is needed.

In some implementations, the one or more user devices 140, 150 are used in conjunction with only local sensors and/or local devices in a house. In these implementations, the system 200 only includes the one or more user devices 140, 150, the sensors 120, the module 122, and the camera 130. The one or more user devices 140, 150 receive data directly from the sensors 120, the module 122, and the camera 130 and sends data directly to the sensors 120, the module 122, and the camera 130. The one or more user devices 140, 150 provide the appropriate interfaces/processing to provide visual surveillance and reporting.

In other implementations, the system 200 further includes network 105 and the sensors 120, the module 122, and the camera 130 are configured to communicate sensor and image data to the one or more user devices 140, 150 over network 105 (e.g., the Internet, cellular network, etc.). In yet another implementation, the sensors 120, the module 122, and the camera 130 (or a component, such as a bridge/router) are intelligent enough to change the communication pathway from a direct local pathway when the one or more user devices 140, 150 are in close physical proximity to the sensors 120, the module 122, and the camera 130 to a pathway over network 105 when the one or more user devices 140, 150 are farther from the sensors 120, the module 122, and the camera 130. In some examples, the system leverages GPS information from the one or more user devices 140, 150 to determine whether the one or more user devices 140, 150 are close enough to the sensors 120, the module 122, and the camera 130 to use the direct local pathway or whether the one or more user devices 140, 150 are far enough from the sensors 120, the module 122, and the camera 130 that the pathway over network 105 is required. In other examples, the system leverages status communications (e.g., pinging) between the one or more user devices 140, 150 and the sensors 120, the module 122, and the camera 130 to determine whether communication using the direct local pathway is possible. If communication using the direct local pathway is possible, the one or more user devices 140, 150 communicate with the sensors 120, the module 122, and the camera 130 using the direct local pathway. If communication using the direct local pathway is not possible, the one or more user devices 140, 150 communicate with the sensors 120, the module 122, and the camera 130 using the pathway over network 105.

In some implementations, the system 200 provides end users with access to images captured by the camera 130 to aid in decision making. The system 200 may transmit the images captured by the camera 130 over a wireless WAN network to the user devices 140, 150. Because transmission over a wireless WAN network may be relatively expensive, the system 200 uses several techniques to reduce costs while providing access to significant levels of useful visual information.

In some implementations, a state of the monitoring system and other events sensed by the monitoring system may be used to enable/disable video/image recording devices (e.g., the camera 130). In these implementations, the camera 130 may be set to capture images on a periodic basis when the alarm system is armed in an "Away" state, but set not to capture images when the alarm system is armed in a "Stay" state or disarmed. In addition, the camera 130 may be triggered to begin capturing images when the alarm system detects an event, such as an alarm event, a door opening event for a door that leads to an area within a field of view of the camera 130, or motion in the area within the field of view of the camera 130. In other implementations, the camera 130 may capture images continuously, but the captured images may be stored or transmitted over a network when needed.

In some implementations, the system 200 provides an alarm probability score to the central alarm station server 170 based on user feedback after an alarm event has been detected. In these implementations, when an alarm event is detected at a monitored property, the system 200 (e.g., the monitoring system control unit 110 or the monitoring application server 160) sends a notification of the alarm event to the central alarm station server 170. The system 200 also accesses one or more images of the alarm event (e.g., concurrently or shortly after sending the notification) and sends the accessed one or more images to the end user (e.g., to the one or more user devices 140, 150). The end user is able to perceive the one or more images of the alarm event on a user device, assess whether the end user believes the alarm event is a real alarm event or a false alarm, and provide user input based on the assessment. The system 200 receives the user input provided by the end user, determines an alarm probability score based on the user input, and sends the alarm probability score to the central alarm station server 170 to assist in handling the alarm event corresponding the notification previously sent to the central alarm station server 170.

For example, the end user may be given three buttons—REAL, FALSE, NOT SURE. If the end user hits "REAL," the system 200 sends the central alarm station server 170 a message that indicates "Alarm Validity=100%" to supplement the notification previously sent to the central alarm station server 170. If the end user marks the alarm event "FALSE," the system 200 sends the central alarm station server 170 a message that indicates "Alarm Validity=0%" to supplement the notification previously sent to the central alarm station server 170. If the end user marks the alarm event "NOT SURE," the system 200 sends the central alarm station server 170 a message that indicates "Alarm Validity=50%" to supplement the notification previously sent to the central alarm station server 170. The alarm validity score is sent to the central alarm station server 170 after the central alarm station server 170 has already received the initial notification of the alarm event.

The alarm validity score may be used by the central alarm station server 170 to tailor handling of the alarm event. For instance, when the central alarm station server 170 receives a message that indicates "Alarm Validity=100%," the central alarm station server 170 may immediately dispatch emergency services to assist with the alarm event. When the central alarm station server 170 receives a message that indicates "Alarm Validity=0%," the central alarm station server 170 may designate the alarm event as a false alarm and stop processing the alarm event. When the central alarm station server 170 receives a message that indicates "Alarm Validity=50%," the central alarm station server 170 may continue attempting to verify whether the alarm event is real (e.g., by contacting users of the security system) prior to dispatching emergency services.

In some examples, even for systems without image capability, the system 200 may use a body of data on alarm events collected over time to determine an alarm probability measure. For instance, the system 200 may perform heuristics on the body of data on alarm events collected over time to estimate the likelihood of a current alarm event being real or false. In this instance, the system 200 determines an Alarm Validity percentage for a detected alarm event (e.g., 80%, 20%, etc.) and sends the Alarm Validity percentage to the central alarm station server 170 concurrently with or shortly after a notification of the alarm event. The central alarm station server 170 may provide relatively high priority to the alarm event when the Alarm Validity percentage is seventy-five percent or above, may provide relatively medium priority to the alarm event when the Alarm Validity percentage is twenty-five to seventy-five percent, and may provide relatively low priority to the alarm event when the Alarm Validity percentage is twenty-five percent or below. The system 200 may consider user feedback in addition to heuristics on the body of data on alarm events collected over time in determining the Alarm Validity percentage.

In some implementations, the system 200 may receive feedback from the central alarm station server 170 and use the feedback to improve the heuristics used to determine Alarm Validity percentages. In these implementations, the central alarm station server 170 may determine whether alarm events are real or false and send the information back to the monitoring application server 160. The monitoring application server 160 may compare the information regarding whether alarm events are real or false with the Alarm Validity percentages determined for the alarm events and, based on the comparison, verify and improve the heuristics used to determine Alarm Validity percentages.

Figure 3:
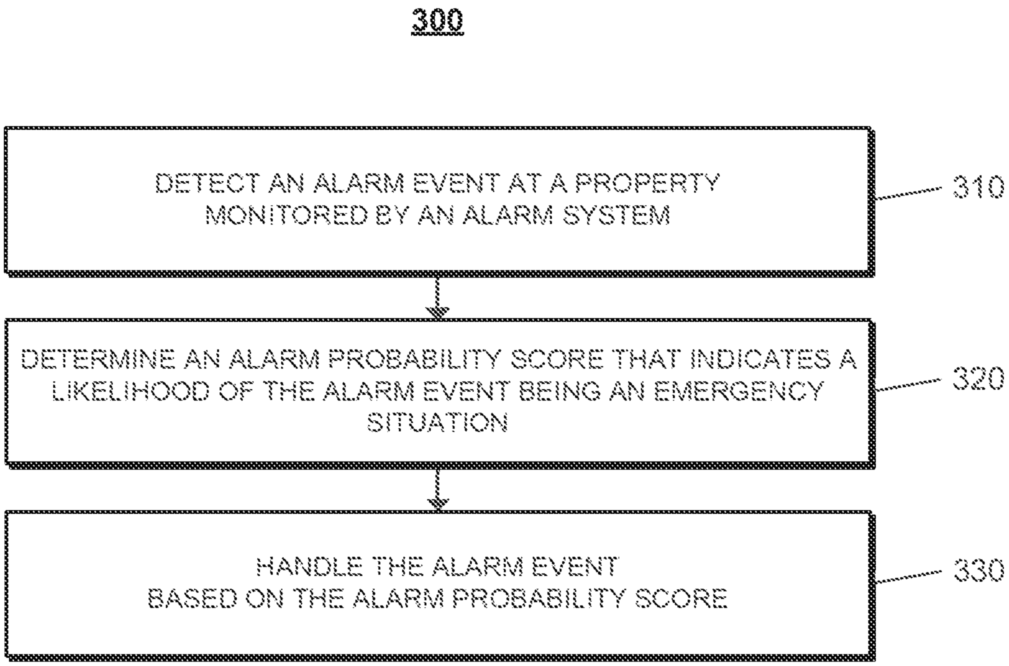
FIGS. 3, 4, and 7 are flow charts of example processes.
Figure 4:
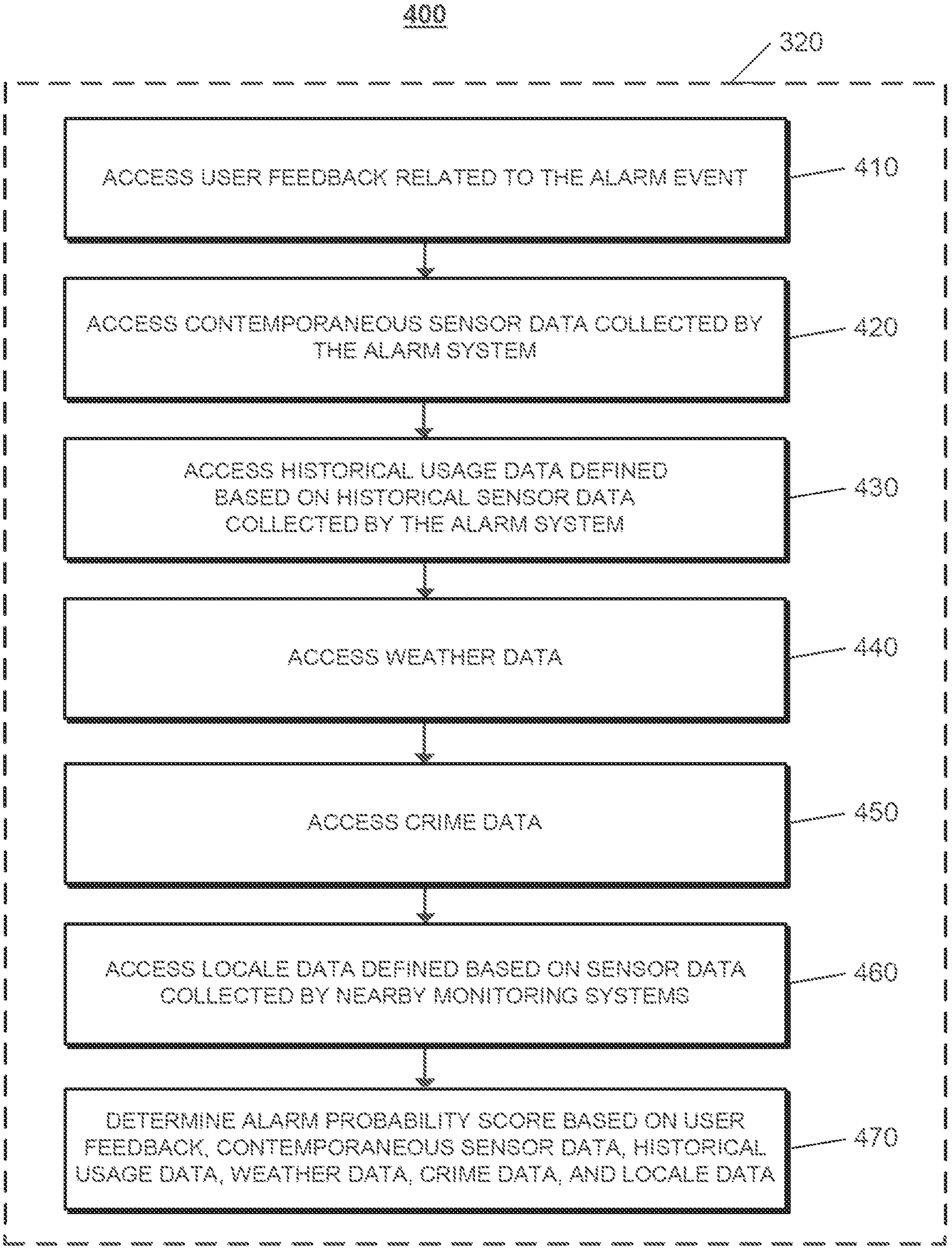
Figure 7:
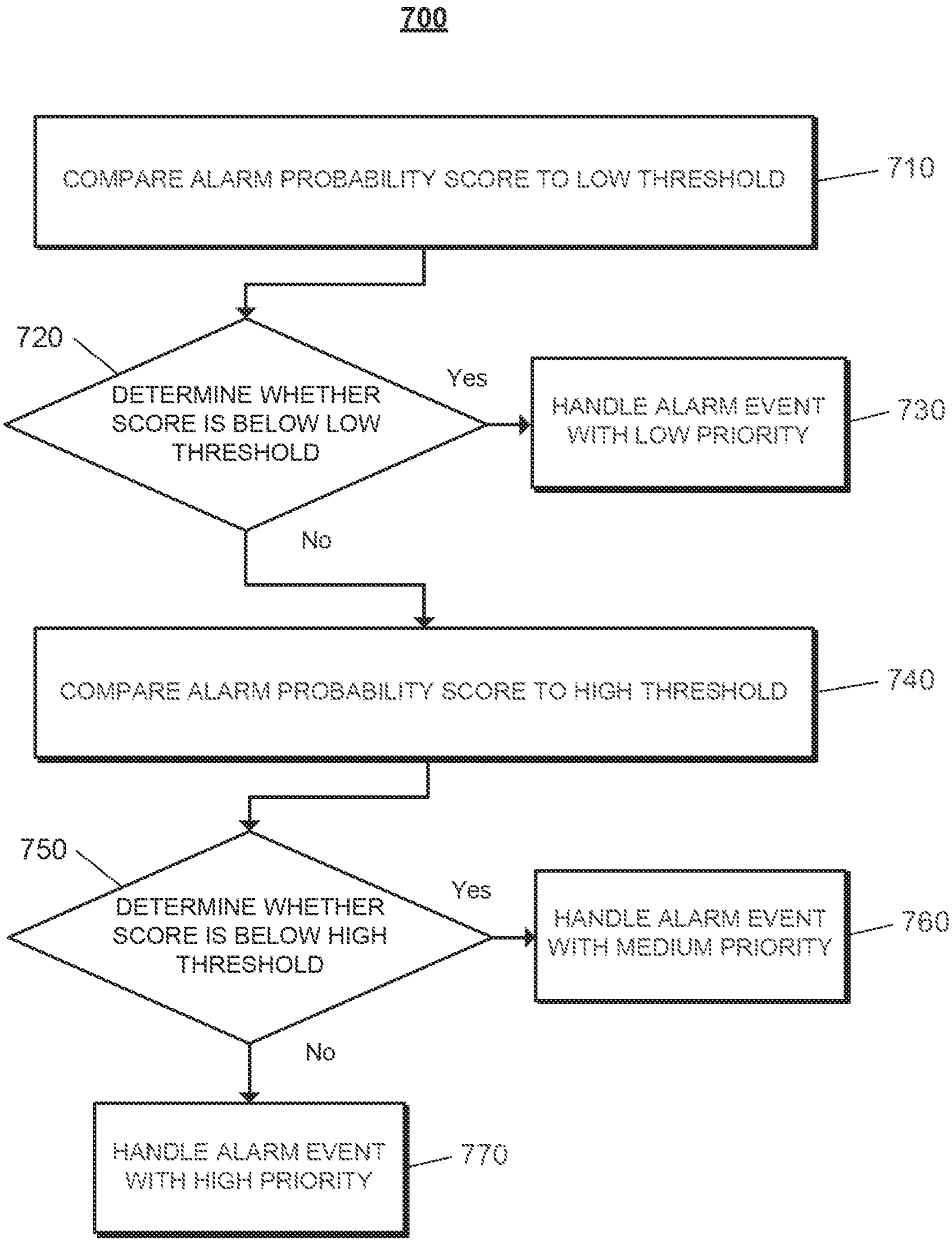

FIGS. 3, 4, and 7 illustrate example processes. The operations of the example processes are described generally as being performed by the system 200. The operations of the example processes may be performed by one of the components of the system 200 (e.g., the monitor control unit 110, the monitoring application server 160, etc.) or may be performed by any combination of the components of the system 200. In some implementations, operations of the example processes may be performed by one or more processors included in one or more electronic devices.

FIG. 3 illustrates an example process 300 for handling alarm events based on alarm probability. Briefly, the system 200 detects an alarm event at a property monitored by an alarm system (310). Based on detecting the alarm event, the system 200 determines an alarm probability score that indicates the likelihood that the alarm even is an emergency situation (320). Using the determined alarm probability score, the system 200 handles the alarm event (330).

The example process 300 begins when the system 200 detects an alarm event at a property monitored by an alarm system (310). In some instances, detecting an alarm event includes receiving an indication from one or more sensors 120 associated with the alarm system. For example, the alarm system may receive an indication from one or more door sensors, window sensors, temperature sensors, humidity sensors, noise sensors, motion sensors, or other sensors indicating that an alarm event has occurred. In some implementations, the detection of the alarm event may be performed by a control panel associated with the alarm system, where the various sensors of the alarm system may be connected to the control panel using one or more wired or wireless connections.

In some instances, detecting an alarm event at the property monitored by the alarm system can occur through other mechanisms. For example, a user associated with the property may notify the system 200 of an alarm event. Notifying the system of an alarm event may be performed, for example, by indicating that an alarm event has occurred at a control panel of the alarm system, or by indicating that an alarm event has occurred using a surveillance application loaded on a user device 140, 150 associated with the alarm system monitoring the property.

Based on detecting the alarm event at the property, the system 200 determines an alarm probability score that indicates a likelihood of the alarm event being an emergency situation (320). The alarm probability score may be determined using a number of factors and information, as shall be explained, and may be used to determine a handling of the detected alarm event by the system 200.

In some implementations, determining the alarm probability score may include reporting the detected alarm event to a user device 140, 150 associated with the property monitored by the alarm system, where the report may include information identifying the detected alarm event and/or a request to verify whether the alarm event relates to an emergency situation. The system 200 may receive feedback related to the verification of the alarm event as an emergency situation, for example, from a user associated with the user device 140, 150, and may determine the alarm probability score based on the received feedback.

In some instances, reporting the detected alarm event to the user device 140, 150 may include accessing image data of an area of the property associated with the alarm event and providing the user device 140, 150 with the image data when sending the report to the device 140, 150. Providing the image data with the report of the detected alarm event and the request for verification of whether the alarm event is an emergency situation may enable a user of the user device 140, 150 to more readily determine whether the alarm event is an emergency that requires emergency services.

In providing the report of the detected alarm event to the user device 140, 150, the system 200 may also include with the report a request for feedback relating to whether the detected alarm event is an emergency situation, where the request for feedback may include requesting the user to indicate that the user (1) believes the alarm event relates to an emergency situation, (2) the user does not believe the alarm event relates to an emergency situation, or (3) the user is not sure of whether the alarm event relates to an emergency situation. In response to providing the request for feedback, the system 200 may receive a response indicating that the user believes the alarm event relates to an emergency situation, that the user does not believe that the alarm event relates to an emergency situation, or that the user is not sure whether the alarm event relates to an emergency situation, and may determine an alarm probability score based on the received feedback.

The system 200 may also perform heuristics upon available data that is relevant to the detected alarm event to generate the alarm probability score that estimates the likelihood that the alarm event is an emergency situation.

Heuristics may be performed on data accessed at the alarm system monitoring the property as well as data accessed at systems external to the system 200. In some instances, heuristics may be performed on available data relevant to the alarm event that is accessed as contemporaneous sensor data collected by the alarm system. For example, the contemporaneous sensor data may be sensor data captured from one or more sensors 120 associated with the monitor control unit 110. The system 200 may evaluate whether the contemporaneous sensor data suggests that the alarm event relates to an emergency situation and may estimate the likelihood that the event is an emergency situation based on the contemporaneous sensor data, i.e., by using the contemporaneous sensor data to determine an alarm probability score associated with the event.

Historical usage data defined based on historical sensor data collected by the system 200 may also be accessed, evaluated, and used to estimate the likelihood of an alarm event being an emergency situation. The historical data may be data collected from sensors 120 during past time periods that are similar to a time frame of the detected alarm event, and may be used to determine an alarm probability score associated with the detected alarm event that can be used by the system 200 to determine how to handle the detected alarm event.

In some instances, external data that is relevant to the detected alarm event can include weather conditions at the property monitored by the system 200 at a time associated with the alarm event. The system 200 may evaluate whether the external data suggests that the alarm event could have been caused by weather conditions, and may estimate the likelihood of the alarm event being an emergency situation based on the evaluation of the accessed weather data.

External data accessed by the system 200 may also include crime data that is relevant to the detected alarm event and captured by a system other than the alarm system. The system may access data that describes crime activity in a region of the property monitored by the alarm system, may evaluate whether the crime data suggests that the alarm event matches crime activity reported in the region of the property monitored by the system 200, and based on the evaluation of the crime data, may estimate the likelihood that the detected alarm event is an emergency situation. For example, the system 200 may determine an alarm probability score associated with the alarm event based at least in part on the evaluation of whether the crime activity in the region of the property matches the detected alarm event.

The system 200 may access locale data defined based on sensor data collected by other monitoring systems located in a region of the property monitored by the system 200, and may use the accessed locale data to determine the likelihood that a detected alarm event is an emergency situation. The system 200 may evaluate whether the locale data suggests that the alarm event is similar to other alarm events detected by the other monitoring systems located in the region of the property monitored by the alarm system, and may use the evaluation in determining an alarm probability score to associate with the alarm event.

The system 200 may determine the alarm probability score indicating a likelihood of the alarm event being an emergency situation based on a combination of received feedback and the performed heuristics. The system 200, as described, may receive feedback indicating whether a user believes a detected alarm event to be an emergency situation, for example, from a user device 140, 150 associated with the property that is monitored by the system 200. Additionally, the system 200 may perform heuristics on available data, such as available sensor data for sensors 120, or a combination of one or more of sensor data, historical data, weather data, crime data, and/or locale data. The system 200 may then determine the alarm probability score based on a combination of the feedback data and the heuristics performed on the accessed data, and use the alarm probability score to determine handling of the detected alarm event by the system 200.

After determining the alarm probability score, the system 200 handles the alarm event based on the alarm probability score (330). In some implementations, handling the alarm event based on the determined alarm probability includes reporting the alarm event along with an indication of the determined alarm probability score to a central monitoring service that dispatches emergency services in response to alarm events. Reporting the event to the central monitoring service may comprise communicating a report to the central alarm station server 170 over a network 105.

In some instances, reporting the alarm event to the central monitoring service may also comprise including with the report an indication of feedback received relating to the detected alarm event. For example, based on the system 200 receiving feedback from user devices 140, 150 indicating whether a user believes the detected alarm event to be an emergency situation, not an emergency situation, or that they are not sure, the system 200 may provide the received feedback to the central monitoring service when providing the report of the alarm event.

Additionally or alternatively, the system 200 may include accessed image data of an area of the property associated with the alarm event when reporting the event to the central monitoring service. For example, based on detecting the alarm event, the system 200 may access image data from one or more cameras 130 that shows the area of the property associated with the alarm event, and may include the accessed image data with the report of the alarm event and the determined alarm probability score that is communicated to the central monitoring service.

In some implementations, the system 200 may determine the handling of an alarm event by comparing the determined alarm probability score to a threshold. The system 200 may determine whether the alarm probability score meets the threshold, and based on the alarm probability score meeting the threshold may report the alarm event to a central monitoring service that dispatches emergency services in response to alarm events.

In some instances, the system 200 compares the alarm probability score to the threshold, determines that the alarm probability score does not meet the threshold, and based on the alarm probability score not meeting the threshold, delays reporting the alarm event to the central monitoring service that dispatches emergency services to enable the system 200 to collect more information related to whether the alarm event is an emergency situation.

For example, in some implementations, the system 200 determines that the alarm probability score does not satisfy the threshold and delays reporting the detected alarm event to the central monitoring service so that the system 200 may report the alarm event to a user device 140, 150 associated with the property along with a request for feedback. The request for feedback may include a request for a user to verify whether the detected alarm system is an emergency situation, and the system 200 may delay reporting the alarm event to the central monitoring service until the system 200 receives feedback from user devices 140, 150 indicating whether a user believes the alarm event is an emergency situation, is not an emergency situation, or is not sure. Based on collecting the feedback, the system 200 may then handle the situation by reporting the alarm event to the central monitoring service, for example, when the feedback indicates that the alarm event is an emergency situation. Alternatively, the system may handle the event by not reporting the alarm event to the central monitoring service, such as when the feedback indicates that the alarm event is not an emergency situation, or may report the event to the central monitoring service with instructions that the central monitoring service should initiate an alarm verification process and/or monitor for further input, such as when the feedback from the user devices 140, 150 indicates that the user is not sure whether the detected alarm event is an emergency situation.

In some implementations, handling the alarm includes assigning a low, medium, or priority to the alarm event based on the alarm probability score. The system 200 may compare the determined alarm probability score to two thresholds to determine the priority. The alarm event may be assigned a high priority if the determined alarm probability score meets a high threshold, may be assigned a medium priority based on meeting a low threshold, but not the high threshold, and may be assigned a low priority based on the alarm probability score not meeting the low threshold. The alarm event may then be handled based on the assigned priority. For example, an alarm event being assigned a high priority may result in the system 200 reporting the alarm event to the central monitoring service immediately, the alarm event being assigned a low priority may result in the system 200 reporting the alarm event to a user device 140, 150 with a request to verify the alarm event while delaying the reporting of the alarm event to the central monitoring service, and the alarm event being assigned a medium priority may result in the alarm event being reported to both the user devices 140, 150 as well as the central monitoring service, with the report to the central monitoring service indicating instructions to initiate alarm verification processes and monitor for further input.

In some instances, receiving feedback from one or more user devices 140, 150 to handle the detected alarm event can include updating one or more rules used in determining the alarm probability score based on the received feedback. For example, the received feedback may indicate whether a detected alarm event is an emergency situation, is not an emergency situation, or that a user is uncertain as to whether the alarm event is an emergency situation, and the system 200 may alter one or more rules used in determining the alarm probability score based on the feedback. Altering the one or more rules may include, for example, altering one or more rules that are used in performing heuristics on available data relevant to the alarm event to determine the alarm probability score estimating the likelihood of the alarm event being an emergency situation. By updating the one or more rules, future alarm events that are detected by the system 200 may be assigned alarm probability scores that are better estimates of the likelihood that the detected alarm events are emergency situations, therefore increasing the appropriateness of the handling of the alarm events by the system 200.

FIG. 4 illustrates an example process 400 for determining an alarm probability score that indicates a likelihood of the alarm event being an emergency situation. The process 400 begins by accessing user feedback related to the alarm event (410). In some implementations, as described, the system 200 may provide a report to a user device 140, 150 based on detecting an alarm event, where the report may request user feedback relating to whether the detected alarm event is an emergency situation. In response to receiving the report with the request for feedback, a user associated with the user device 140, 150 may provide feedback indicating whether the detected alarm event is an emergency event, is not an emergency event, or if the user is unsure of whether the alarm event is an emergency situation. The system 200 may then access data indicating the user feedback relating to the alarm event, for example, by receiving the feedback over a network 105.

The system 200 may then access contemporaneous sensor data collected by the alarm system monitoring the property (420). In some implementations, accessing the contemporaneous sensor data may include accessing data from one or more sensors 120 collected by the monitor control unit 110. The sensor data may be accessed over a network 105 by communicating with a network module 114 of the monitor control unit 110. Contemporaneous sensor data may include data from any number of sensors associated with the system 200 monitoring the property, including one or more door sensors, window sensors, motion sensors, temperature sensors, humidity sensors, noise sensors, or other sensor types.

The system 200 accesses historical usage data defined based on historical sensor data collected by the alarm system (430). The system 200 may access the historical data by determining historical data collected by the sensors 120 associated with the monitor control unit and stored by the system, for example, in a storage device associated with the monitor control unit, in a storage device associated with the monitoring application server 160, or stored in another location. Accessing historical data may include accessing historical sensor data that is relevant to the detected alarm event such as, for example, sensor data from past time periods that are similar to the time frame in which the alarm event was detected.

In some implementations, the system 200 may then access weather data (440). Accessing weather data may involve accessing weather data from a system other than the alarm system monitoring the property, for example, by accessing weather data provided by a weather service system. In some implementations, the weather data may be accessible over a network 105. For example, the weather data may accessed by a monitoring application server 160 associated with the system 200, or may accessed at another source.

The system 200 accesses crime data (450) by retrieving data indicating crime activity in the region of the property monitored by the system 200. In some implementations, the crime data may be available at a system other than the system 200, where the crime data may be crime data collected over a period of time relevant to the detected alarm event. For example, the crime data may be historical crime data for the region of the property, such as crime data for the region over a period of five years, may be crime data for the region of the property relevant to the time frame of the detected alarm event, such as data indicating crime activity in the region of the property around the time of 2:00 AM, or may be a combination of historical and time-relevant crime data, such as data indicating crime activity in the area around the time of 2:00 AM over the past six months. The crime data may be accessed by the system 200 over a network 105, for example, by accessing crime data available at the central alarm station server 170, at an emergency services provider server (e.g., a police department), or at another source.

The system 200 accesses locale data defined based on sensor data collected by nearby monitoring systems (460). In some instances, the nearby monitoring systems may be other alarm systems similar to the system 200 monitoring the property. Locale data may include, for example, any data indicating that alarm events similar to that detected by the system 200 have been detected by the other systems, or may indicate a lack of such similar detected alarm events. The accessed locale data may be used by the system 200 to determine the likelihood at the detected alarm event is an emergency situation, that is, by using the locale data to determine an alarm probability score associated with the detected alarm event. As an example, a system 200 may detect an event in which a window at the property is broken and may access locale data indicating that a number of other window breaking events have occurred at a similar time frame in the region. Based at least in part on the accessed locale data, the system 200 may determine, for example, that the detected alarm event may be due to a strong storm in the region and may estimate the likelihood of the event being an emergency situation based on determining the that the detected alarm event may be related to a strong storm in the region.

Based on the accessed user feedback, contemporaneous sensor data, historical usage data, weather data, crime data, and locale data, the system may determine an alarm probability score associated with the detected alarm event (470). In some implementations, the system 200 may determine the alarm probability score by performing heuristics on the accessed data, where performing the heuristics on the accessed data may enable the system 200 to determine an alarm probability score that estimates the likelihood that a detected alarm event is an emergency situation.

While the process 400 has been presented here in one possible implementation, in practice, the process 400 may include more steps, less steps, or different steps, or may perform the steps in a different order than that presented, in order to achieve the objects of the process 400 to determine an alarm probability score that indicates a likelihood of the detected alarm event being an emergency situation.

Figure 5:
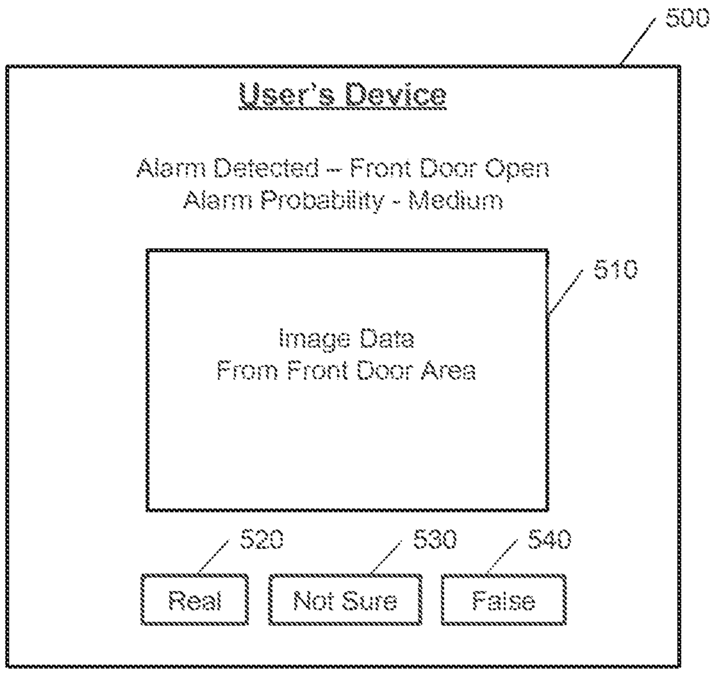
FIG. 5 illustrates an example interface.

FIG. 5 illustrates an example of an interface 500 that reports a detected alarm event and requests verification of whether the detected alarm event relates to an emergency situation. In some implementations, the interface 500 may be presented at a display of a user device 140, 150 associated with the property being monitored by the system 200 in response to the system 200 detecting an alarm event.

The interface 500 may include a report of the detected alarm event, as well as an indication of the alarm probability of the detected alarm event. For example, the system 200 may detect a door opening event while the system is in an armed state, and in response to detecting the door opening may provide the report "Alarm Detected—Front Door Opened" at the interface 500. Additionally, the report may include the message "Alarm Probability—Medium" at the interface 500, indicating the estimated likelihood of the detected alarm event being an emergency situation. While shown in this example as a priority level of "medium," in other implementations, the interface 500 may provide the alarm probability score determined by the system 200 for the front door opening event. For example, the interface 500 may provide the message "Alarm Detected—Front Door Open" as well as the message "Alarm Probability—55%" at the user associated with the user device 140, 150.

The interface 500 may also include image data 510 associated with the detected alarm event. For the example shown in FIG. 5, the image data 510 may be an image from the front door area of the property that has been collected by a camera 130 associated with the system 200 and accessed by the monitor control unit 110. Providing the image data 510 may enable a user associated with the user device 140, 150 to analyze the report of the detected alarm event, and to potentially determine whether the detected alarm event is an emergency situation.

In addition to the report of the detected alarm event and the image data 510, the interface 500 may present options 520-540, where a user can select one of the options 520-540 to provide feedback related to the detected alarm event. As shown in FIG. 5, the options 520-540 include a first option 520 "Real" indicating that the user believes the reported alarm event is a real emergency situation, a second option 530 "Not Sure" indicating that the user is not sure whether the reported alarm event is a real emergency situation, and a third option 540 "False" indicating that the user believes reported alarm event is not a real emergency situation. A user having a user device 140, 150 associated with the property that is monitored by the system 200 may receive the report of the alarm event and the image data 510 associated with the alarm event, and based on the report and the image data 510, may select one of the options 520-540 to provide feedback relating to whether the detected alarm event is an emergency situation. Based on the feedback provided by the user at the interface 500, the system 200 may handle the detected alarm event. For example, the system 200, based on the received feedback, may update an alarm probability score associated with the detected alarm event, may report the alarm event to a central monitoring service, or may handle the detected alarm event in another way.

FIG. 6 illustrates an example data record related to determining an alarm probability score that estimates the likelihood of a detected alarm event being an emergency situation. The data record 600 stores one or more probability factors 610 used in determining an alarm probability score associated with a detected alarm event, as well as weights 620 associated with the one or more probability factors 610. Based on detecting an alarm event, the system 200 may access information relating to the detected alarm event and may also access the data record 600 to determine an alarm probability score to assign to the detected alarm.

The probability factors 610 of the data record 600 may be used to perform heuristics on the accessed data relating to the detected alarm event, where performing heuristics on the accessed data enables the system 200 to determine an alarm probability score for the detected alarm event. For example, in some implementations, the system 200 may access data relevant to the detected alarm event, may determine whether the accessed data satisfies each of the probability factors 610 (e.g., whether each probability factor 610 is true or false based on the accessed data), and may assign a score to each probability factor 610 based on whether the probability factor 610 is satisfied and based on the weight 620 associated with the probability factor 610. The system 200 may then determine an alarm probability score associated with the detected alarm event by, for example, summing the scores associated with each probability factor 610. For example, the system 200 may assign each probability factor 610 a score equal to the weight 620 associated with that probability factor 610 if the probability factor 610 is evaluated as being true based on the accessed data, and may otherwise assign the probability factor 610 a score of zero if the probability factor 610 is evaluated as being false. The system 200 may then sum the scores assigned to each probability factor 610, where the sum is determined as the alarm probability score associated with the detected event. The system 200 may then handle the determined alarm event based on the alarm probability score.

As shown in FIG. 6, the data record 600 includes probability factors 630-690, where each of the probability factors 630-690 is associated with a weight. Briefly, the data record 600 includes the probability factor 630 "User Report of Real" with a weight of 100. In practice, the probability factor 630 evaluates true based on a user providing feedback that a detected alarm event is an emergency situation. The data record 600 includes the probability factor 635 "User Report of False" with a weight of −100, where the probability factor 635 may evaluate true based on the user providing feedback indicating that the detected alarm event was not an emergency situation. The data record 600 further includes the probability factor 640 "User Report of Unsure" with a weight of 0, where the probability factor 640 may evaluate true based on the user providing feedback indicating that they are not sure whether the detected alarm event is an emergency situation. The data record 600 includes the probability factor 645 "Contemporaneous Sensor Data Indicates False" with a weight of −20, where the probability factor 645 may evaluate true based on the other sensors associated with the alarm system collecting data indicating that the detected alarm event may not be an emergency situation. The data record 600 includes the probability factor 650 "Contemporaneous Sensor Data Indicates Real" with a weight of 20, where the probability factor 650 may be evaluated as true based on the other sensors associated with the alarm system collecting data that indicates that the detected alarm event may be an emergency situation, i.e., that the detected alarm event is a real emergency. The data record 600 further includes probability factor 655 "Alarm Event Aligns with Historical Sensor Data" with a weight of −10, where the probability factor 655 may be evaluated as true based on the system 200 determining that accessed historical data indicates that the detected alarm event may not be an emergency situation. The data record includes the probability factor 660 "Alarm Event Does Not Align with Historical Sensor Data" with a weight of 10, where the probability factor 660 may be evaluated true based on the system accessing historical data that indicates that the detected alarm event may be an emergency situation, i.e., that the detected alarm event is unusual based on the accessed historical data and therefore may indicate that the alarm event is a real emergency. The data record 600 includes the probability factor 665 "Weather Adverse" with a weight of −5, where the system 200 may evaluate the probability factor 665 as true based on the system 200 accessing data that indicates that the weather may be adverse, e.g., that there is a thunderstorm in the area that may lead to false alarm events being detected due to high winds, etc. The data record 600 also includes the probability factor 670 "Weather Normal" with a weight of 0, where the system 200 may evaluate the probability factor 670 as true based on accessing data that indicates that the weather is not adverse or abnormal. The data record 600 further includes the probability factor 675 "Alarm Event Aligns with Recent Crime Activity" with a weight of 10, where the probability factor 675 may be evaluated true based on accessing data that indicates recent crime activity in the region of the property and determining that the detected alarm event aligns with the recent crime activity in the region of the property. For example, the system 200 may determine that the detected alarm event occurs at a time that aligns with the time of recent crime activity in the region of the property, and may therefore evaluate the probability factor 675 as true. The data record 600 includes the probability factor 680 "Alarm Event Does Not Align with Recent Crime Activity" with a weight of 0, where the system 200 may evaluate the probability factor 680 as true based on accessing data indicating recent crime activity in the region of the property and determining that the detected alarm event does not align with the recent crime activity in the region of the property. The data record 600 includes the probability factor 685 "Alarm Event Aligns with Other Alarm Events Detected by Nearby Alarm Systems" with a weight of 10, where the system 200 may access data collected by alarm systems other than the system 200, and based on the accessed data may determine whether the detected alarm event aligns with other alarm events detected by the other alarm systems. The data record 600 includes the probability factor 690 "Alarm Event Does Not Align with Other Alarm Events Detected by Nearby Alarm Systems with a weight of 0, where the system 200 may, based on accessing data collected by alarm systems other than the system 200, determine that the detected alarm event does not align with alarm events detected by the other alarm systems.

While the data record 600 shown in FIG. 6 includes the specific probability factors 630-690 and corresponding weights, in practice, the data record 600 may include more probability factors, less probability factors, different probability factors, or may provide different weights to the various probability factors. The system 200 may furthermore use the data record 600 and the weights associated with the probability factors to determine an alarm probability score in a different manner, for example, by multiplying a value associated with the probability factor by the weight and summing the products to determine an alarm probability score.

FIG. 7 illustrates an example process 700 for determining a priority assigned to a detected alarm event. The process 700 determines a priority for a detected alarm event by comparing a determined alarm probability score for the alarm event to two thresholds to assign the alarm event one of a low, medium, or high priority.

The process 700 begins by comparing the alarm probability score to a low threshold (710). For example, a first, low threshold may have a value of 25% and the system 200 may compare a determined alarm probability score to the 25% threshold. The system 200 may determine whether the alarm probability score is below the low threshold (720). For example, an alarm event may have been determined to have an alarm probability score of 90%, and the system 200 may determine whether the alarm probability score of 90% is below the low threshold of 25%. If the alarm probability score is below the low threshold, the detected alarm event is handled with low priority (730), where the process 700 then ends.

If the determined alarm probability score meets the low threshold, the system 200 compares the alarm probability score to second, high threshold (740). For example, a second, high threshold may have a value of 75% and the system 200 may compare the determined alarm probability score associated with the alarm event to the 75% threshold. The system 200 may determine whether the alarm probability score is below the high threshold (750). For example, an alarm event may have been determined to have an alarm probability score of 90%, and the system 200 may determine whether the alarm probability score of 90% is below the high threshold of 75%. If the alarm probability score is below the high threshold, the detected alarm event is handled with medium priority (740), where the process 700 then ends. Alternatively, if the determined alarm probability score is not below the high threshold, the system 200 handles the detected alarm event with high priority (770). After the detected alarm event has been handled with one of a medium or a high priority, the process 700 then comes to an end.

FIG. 8 shows an example data record 800 containing data indicating how a system 200 handles a detected alarm event based on the priority assigned to the alarm event. The data record 800 includes a set of priorities 810, monitoring server actions 820 associated with each of the priorities 810, and central station actions 830 associated with each of the priorities 810. Based on the system 200 detecting an alarm event, determining an alarm probability score associated with the detected alarm event, and assigning a probability to the detected alarm event based on the alarm probability score, the system 200 may access the data record 800 to determine handling of the alarm event.

The data record 800 includes the record 840 associated with handling an alarm event that has been assigned a low priority. Based on a detected alarm event being assigned a low priority, the system 200 handles the alarm event by performing the operations and/or providing the instructions indicated in the monitoring server actions 820 associated with the low priority event. As shown in FIG. 8, these actions and/or instructions include: (1) reporting the low priority alert, for example, to a user device 140, 150 associated with the system 200, (2) requesting user feedback on the alert, for example, to verify whether the detected alarm event is an emergency situation, (3) continuing to monitor sensor data, such as data from sensors 120 associated with the alarm system, and (4) sending an update to the central station, where the update may indicate any user feedback or data collected from the sensors 120. The system 200 also performs and/or instructs the central station actions 830 associated with low priority alarm events, where the actions include: (1) delaying alarm verification processes, for example, that may attempt to verify whether the detected alarm event is an emergency situation, (2) monitoring for updates from the server, for example, updates that indicate feedback from a user verifying whether the detected alarm event is an emergency event, and (3) initiating alarm verification processes if no updated is received within a threshold period of time, for example, initiating alarm verification processes if an update including user feedback indicating whether the detected alarm event is an emergency situation is not received within an hour of the detected alarm event.

The data record 800 also includes the record 850 associated with handling an alarm event that has been assigned a medium priority. Based on a detected alarm event being assigned a medium priority, the system 200 may handle the alarm event by performing the operations and/or providing the instructions indicated in the monitoring server actions 820 associated with a medium priority event. As shown, the actions include: (1) reporting a medium priority alert, for example, to a user device associated with the alarm system, (2) requesting user feedback relating to the alert, for example, requesting that a user provide feedback indicating whether the detected alarm event is an emergency situation, and (3) providing the feedback to the central station if the feedback is received. In response to an alarm event being assigned a medium priority, the system 200 also requests, performs, or instructs the central station to perform actions (830) including: (1) initiating alarm verification processes, such as processes to determine whether the detected alarm event is an emergency situation, (2) monitors for feedback from the server, for example, feedback from a user indicating whether the detected alarm event is an emergency situation, and (3) dispatching emergency services if the alarm is unverified or is confirmed, for example, if the feedback from the server confirms that the detected alarm event is an emergency situation or if a threshold period of time is surpassed without the detected alarm event being verified as real or false.

The data record 800 includes the record 860 associated with handling an alarm event that has been assigned a high priority. Based on a detected alarm event being assigned a medium priority, the system 200 may handle the alarm event by performing the operations and/or providing the instructions indicated in the monitoring server actions 820 associated with a high priority event. As shown, the actions include: (1) reporting the high priority alarm event, for example, by reporting the high priority alarm event to a user device associated with the system 200, and (2) sending an alert to the user without requesting feedback, where the alert may include other information such as image data of an area associated with the detected alarm event or an indication of the detected alarm event, but may not include a request for user feedback to verify the detected alarm event. In addition, the system 200 may request or instruct the central station actions (830) that include dispatching emergency services immediately upon receipt of the detected alarm event and the priority of the detected alarm event. For example, based on receiving an indication from the system 200 that a high priority alarm event has been detected, the central station may immediately dispatch emergency services to the property to address the detected alarm event.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer implemented method comprising:

detecting a potential alarm event at a property monitored by a monitoring system; and in response to detecting the potential alarm event:

providing, to a device, a message that a) requests an indication whether the potential alarm event is an actual emergency situation and b) includes instructions to cause the device to present a user interface that includes (a) an actual emergency confirmation selectable option, (b) a not an emergency selectable option, and (c) an unknown whether an emergency selectable option; and providing, to a system separate from the device and using i) a response to the message requesting an indication whether the potential alarm event is an actual emergency situation or ii) a determination that a response was not received to the message requesting an indication whether the potential alarm event is an actual emergency situation, a notification about the potential alarm event to another system.

2. The method of claim 1, comprising:

in response to providing the message that includes the instructions, receiving, from the device, the response indicating whether the potential alarm event relates to an emergency situation is unknown; and in response to receiving the response, determining to delay providing the notification about the potential alarm event to another system.

3. The method of claim 2, wherein providing, to the device, the message requesting the indication whether the potential alarm event is an actual emergency situation comprises:

accessing image data of an area of the property associated with the potential alarm event; and providing, to the device associated with the property monitored by the monitoring system, the accessed image data with the message requesting the indication whether the potential alarm event relates to an actual emergency situation to cause the device to present a user interface for the requested indication with at least a portion of the image data.

4. The method of claim 1, wherein providing the notification using the response to the message requesting an indication whether the potential alarm event is an actual emergency situation or the determination that a response was not received to the message requesting an indication whether the potential alarm event is an actual emergency situation comprises:

determining whether a response to the message requesting an indication whether the potential alarm event is an actual emergency situation i) was received or ii) was not received; and providing the notification about the potential alarm event to the other system uses a result of the determination whether a response to the message requesting an indication whether the potential alarm event is an actual emergency situation was received.

5. The method of claim 1, wherein the user interface is presented in a web page.

6. The method of claim 1, wherein the not an emergency selectable option indicates that the potential alarm event is a false alarm.

7. The method of claim 6, comprising:

receiving, for a second potential alarm event, a second response that indicates selection of a second not an emergency selectable option presented in a second user interface by a second device; and disabling an alarm event in response to receiving the second response that indicates selection of the second not an emergency selectable option that indicates that the second potential alarm event was a false alarm.

8. The method of claim 7, comprising:

disabling one or more sensors that were triggered when the potential alarm event began.

9. The method of claim 1, comprising:

storing, in a database and using the response to the message requesting an indication whether the potential alarm event is an actual emergency situation or the determination that the response from the device was not received to the message requesting an indication whether the potential alarm event is an actual emergency situation, data for the potential alarm event and whether a response was received.

10. The method of claim 1, comprising:

receiving, from the device, the response indicating that the potential alarm event relates to an emergency situation; and in response to receiving the response, determining to provide the notification about the potential alarm event to the other system.

11. One or more non-transitory computer storage media encoded with instructions that, when executed by one or more computers, cause the one or more computers to perform operations comprising:

detecting a potential alarm event at a property monitored by a monitoring system; and in response to detecting the potential alarm event:

providing, to a device, a message that a) requests an indication whether the potential alarm event is an actual emergency situation and b) includes instructions to cause the device to present a user interface that includes (a) an actual emergency confirmation selectable option, (b) a not an emergency selectable option, and (c) an unknown whether an emergency selectable option; and providing, to a system separate from the device and using i) a response to the message requesting an indication whether the potential alarm event is an actual emergency situation or ii) a determination that a response was not received to the message requesting an indication whether the potential alarm event is an actual emergency situation, a notification about the potential alarm event to another system.

12. The computer storage media of claim 11, comprising:

in response to providing the message that includes the instructions, receiving, from the device, the response indicating whether the potential alarm event relates to an emergency situation is unknown; and in response to receiving the response, determining to delay providing the notification about the potential alarm event to another system.

13. The computer storage media of claim 12, wherein providing, to the device, the message requesting the indication whether the potential alarm event is an actual emergency situation comprises:

accessing image data of an area of the property associated with the potential alarm event; and providing, to the device associated with the property monitored by the monitoring system, the accessed image data with the message requesting the indication whether the potential alarm event relates to an actual emergency situation to cause the device to present a user interface for the requested indication with at least a portion of the image data.

14. The computer storage media of claim 11, wherein providing the notification using the response to the message requesting an indication whether the potential alarm event is an actual emergency situation or the determination that a response was not received to the message requesting an indication whether the potential alarm event is an actual emergency situation comprises:

determining whether a response to the message requesting an indication whether the potential alarm event is an actual emergency situation i) was received or ii) was not received; and providing the notification about the potential alarm event to the other system using the response to the message requesting an indication whether the potential alarm event is an actual emergency situation or a result of the determination.

15. The computer storage media of claim 11, wherein the user interface is presented in a web page.

16. The computer storage media of claim 11, wherein the not an emergency selectable option indicates that the potential alarm event is a false alarm.

17. The computer storage media of claim 16, comprising:

disabling one or more sensors that were triggered when the potential alarm event began.

18. A system comprising one or more computers and one or more storage devices on which are stored instructions that are operable, when executed by the one or more computers, to cause the one or more computers to perform operations comprising:

detecting a potential alarm event at a property monitored by a monitoring system; and in response to detecting the potential alarm event:

providing, to a device, a message that a) requests an indication whether the potential alarm event is an actual emergency situation and b) includes instructions to cause the device to present a user interface that includes (a) an actual emergency confirmation selectable option, (b) a not an emergency selectable option, and (c) an unknown whether an emergency selectable option; and providing, to a system separate from the device and using i) a response to the message requesting an indication whether the potential alarm event is an actual emergency situation or ii) a determination that a response was not received to the message requesting an indication whether the potential alarm event is an actual emergency situation, a notification about the potential alarm event to another system.

19. The system of claim 18, the operations comprising:

in response to providing the message that includes the instructions, receiving, from the device, the response indicating whether the potential alarm event relates to an emergency situation is unknown; and in response to receiving the response, determining to delay providing the notification about the potential alarm event to another system.

20. The system of claim 19, wherein providing, to the device, the message requesting the indication whether the potential alarm event is an actual emergency situation comprises:

accessing image data of an area of the property associated with the potential alarm event; and providing, to the device associated with the property monitored by the monitoring system, the accessed image data with the message requesting the indication whether the potential alarm event relates to an actual emergency situation to cause the device to present a user interface for the requested indication with at least a portion of the image data.

* * * * *